United States Patent
Ramirez et al.

(10) Patent No.: US 12,518,777 B2
(45) Date of Patent: Jan. 6, 2026

(54) SYSTEMS AND METHODS FOR AUTHENTICATION USING SOUND-BASED VOCALIZATION ANALYSIS

(71) Applicant: Covid Cough, Inc., Greenwood Village, CO (US)

(72) Inventors: Maurice A. Ramirez, Lake Wales, FL (US); Michelle Archuleta, Lakewood, CO (US); Morgan Cox, Lakewood, CO (US); Mark Fogarty, Seneca, SC (US); Robert Scordia, Ridgewood, NY (US); Michael V. Bivins, Orlando, FL (US); Allison A. Sakara, Lake Wales, FL (US); Ariel Jose Alberto Sztern, Katy, TX (US)

(73) Assignee: Covid Cough, Inc., Greenwood Village, CO (US)

( * ) Notice: Subject to any disclaimer, the term of this patent is extended or adjusted under 35 U.S.C. 154(b) by 973 days.

(21) Appl. No.: 17/692,070

(22) Filed: Mar. 10, 2022

(65) Prior Publication Data

US 2022/0293123 A1 Sep. 15, 2022

Related U.S. Application Data

(60) Provisional application No. 63/159,305, filed on Mar. 10, 2021.

(51) Int. Cl.
G10L 25/66 (2013.01)
G10L 25/27 (2013.01)
G10L 25/72 (2013.01)

(52) U.S. Cl.
CPC .............. *G10L 25/66* (2013.01); *G10L 25/27* (2013.01); *G10L 25/72* (2013.01)

(58) Field of Classification Search
None
See application file for complete search history.

(56) References Cited

U.S. PATENT DOCUMENTS

| | | |
|---|---|---|
| 5,199,077 A | 3/1993 | Wilcox et al. |
| 5,660,176 A | 8/1997 | Iliff |

(Continued)

FOREIGN PATENT DOCUMENTS

| | | |
|---|---|---|
| CN | 108766419 B | 10/2020 |
| WO | 2019155052 A1 | 8/2019 |

(Continued)

OTHER PUBLICATIONS

Al Texsoft. "MLOps: Methods and Tools of DevOps for Machine Learning." Jul. 23, 2020 Retrieved on Jun. 26, 2022 from <https://www.altexsoft.com/blog/mlops-methods-tools/> entire document.

(Continued)

*Primary Examiner* — Daniel C Washburn
*Assistant Examiner* — Tyler Becker
(74) *Attorney, Agent, or Firm* — Greenberg Traurig, LLP; Kristopher Reichlen; David J. Dykeman

(57) ABSTRACT

Systems and methods of the present disclosure enable authentication and/or anomaly detection using machine learning-based modelling. Audio recordings that represent audio from a forced cough vocalizations are received from a user device. One or more audio filters extract forced cough vocalization recordings from the audio recordings and signal data signatures representative of the forced cough vocalization recordings are generated. Gaussian mixture models are produced for each unique combination of the signal data signatures, where each unique combination include a group of model baselines and a test match baseline. Each Gaussian mixture model is used to produce a match value for the associated test match baseline based on the associated model (Continued)

baselines, and a statistical score is determined for each match value. One or more baseline Gaussian mixture models are determined based on the statistical score and stored in a user profile.

20 Claims, 30 Drawing Sheets

(56) References Cited

U.S. PATENT DOCUMENTS

| | | | |
|---|---|---|---|
| 7,386,453 | B2 | 6/2008 | Polanyi et al. |
| 9,015,093 | B1 | 4/2015 | Commons |
| 9,418,059 | B1 | 8/2016 | Singliar et al. |
| 10,098,569 | B2 | 10/2018 | Abeyratne et al. |
| 10,796,714 | B2 | 10/2020 | Levanon et al. |
| 11,240,181 | B1 | 2/2022 | Nagaraja et al. |
| 12,070,323 | B2 | 8/2024 | Chou |
| 2004/0193419 | A1 | 9/2004 | Kimball et al. |
| 2007/0026406 | A1 | 2/2007 | ElGhaoui et al. |
| 2007/0276278 | A1 | 11/2007 | Coyle et al. |
| 2008/0059152 | A1 | 3/2008 | Fridman et al. |
| 2009/0125623 | A1 | 5/2009 | Garg et al. |
| 2009/0311657 | A1 | 12/2009 | Dodelson et al. |
| 2009/0312660 | A1 | 12/2009 | Guarino |
| 2016/0078167 | A1 | 3/2016 | Rosner et al. |
| 2016/0246772 | A1 | 8/2016 | Hoover et al. |
| 2017/0003948 | A1 | 1/2017 | Iyer et al. |
| 2017/0180266 | A1 | 6/2017 | Frank et al. |
| 2017/0278018 | A1 | 9/2017 | Winih et al. |
| 2018/0059152 | A1 | 3/2018 | Fridman et al. |
| 2018/0060512 | A1 | 3/2018 | Sorenson et al. |
| 2018/0182362 | A1 | 6/2018 | Li |
| 2019/0347557 | A1 | 11/2019 | Khan |
| 2019/0348064 | A1* | 11/2019 | Lesso ............... A61B 7/003 |
| 2020/0008725 | A1 | 1/2020 | Bach et al. |
| 2020/0015709 | A1 | 1/2020 | Peltonen et al. |
| 2020/0027558 | A1 | 1/2020 | Abeyratne et al. |
| 2020/0034553 | A1 | 1/2020 | Kenyon et al. |
| 2020/0125706 | A1* | 4/2020 | Adir ............... H04L 9/3231 |
| 2020/0143267 | A1 | 5/2020 | Gidney |
| 2020/0152330 | A1 | 5/2020 | Anushiravani et al. |
| 2020/0193735 | A1 | 6/2020 | Jung et al. |
| 2020/0210538 | A1 | 7/2020 | Wang et al. |
| 2020/0234188 | A1 | 7/2020 | Maffei Vallim |
| 2020/0323484 | A1 | 10/2020 | Aronovich et al. |
| 2020/0327379 | A1 | 10/2020 | Dong |
| 2020/0337625 | A1 | 10/2020 | Aimone et al. |
| 2020/0381130 | A1 | 12/2020 | Edwards et al. |
| 2020/0388287 | A1 | 12/2020 | Anushiravani et al. |
| 2020/0411036 | A1 | 12/2020 | Daimo |
| 2021/0049421 | A1 | 2/2021 | Tandecki et al. |
| 2021/0076977 | A1 | 3/2021 | Abeyratne et al. |
| 2021/0128074 | A1 | 5/2021 | Leydon |
| 2021/0219893 | A1 | 7/2021 | Luz et al. |
| 2021/0234668 | A1 | 7/2021 | Manamohan et al. |
| 2021/0248517 | A1 | 8/2021 | Soppin et al. |
| 2021/0338154 | A1 | 11/2021 | Abeyratne |
| 2021/0357586 | A1 | 11/2021 | Archuleta |
| 2021/0361227 | A1 | 11/2021 | Chou et al. |
| 2022/0027725 | A1 | 1/2022 | Nongpiur et al. |
| 2022/0029986 | A1* | 1/2022 | Neumann ............... G16H 10/60 |
| 2022/0058339 | A1 | 2/2022 | Archuleta |
| 2022/0067445 | A1 | 3/2022 | Archuleta et al. |
| 2022/0122740 | A1 | 4/2022 | Nematiosseinabadi et al. |
| 2022/0130415 | A1 | 4/2022 | Garrison et al. |
| 2022/0215248 | A1 | 7/2022 | Ramirez et al. |
| 2022/0300856 | A1 | 9/2022 | Archuleta et al. |
| 2022/0309407 | A1 | 9/2022 | Ramirez et al. |
| 2023/0329646 | A1 | 10/2023 | Zhou |
| 2023/0368000 | A1 | 11/2023 | Cox et al. |
| 2023/0368026 | A1 | 11/2023 | Cox et al. |
| 2024/0127078 | A1 | 4/2024 | Elyaderani et al. |

FOREIGN PATENT DOCUMENTS

| | | |
|---|---|---|
| WO | 2020051256 A1 | 3/2020 |
| WO | 2020069048 A1 | 4/2020 |
| WO | 2020104465 A2 | 5/2020 |
| WO | 2021119742 A1 | 6/2021 |
| WO | 2021119743 A1 | 6/2021 |
| WO | 2021253093 A1 | 12/2021 |
| WO | 2022051523 A1 | 3/2022 |
| WO | 2022091062 A1 | 5/2022 |
| WO | 2022147566 A1 | 7/2022 |
| WO | 2022192606 A1 | 9/2022 |
| WO | 2022198105 A1 | 9/2022 |
| WO | 2022204573 A1 | 9/2022 |
| WO | 2023220665 A1 | 11/2023 |
| WO | 2023220683 A1 | 11/2023 |
| WO | 2024059792 A1 | 3/2024 |
| WO | 2024059796 A1 | 3/2024 |

OTHER PUBLICATIONS

Rodriguez et al. "Hybrid analysis pipelines in the REANA reproducible analysis platform." EPJ Web of Conferences. vol. 245. EDP Sciences, 2020. Nov. 16, 2020. Retrieved on Jun. 26, 2022 from <https://www.epj-conferences.org/articles/epjconf/abs/2020/21/epjconf_chep2020_06041/epjco nf_chep2020_06041.html> entire document.

Shen, "Movements Classification of Multi-Channel sEMG Based on CNN and Stacking Ensemble Learning" Special Section on Smart Health Sensing and Computational Intelligence: from Big Data to Big Impacts. IEEE Access, vol. 7, pp. 137489-137500, Oct. 3, 2019.

Stewart "Software as a Medical Device (SAMO): Clinical Evaluation—Guidance for Industry 1-20 and Food and Drug Administration Staff" U.S. Department of Health and Human Services, Food and Drug Administration, Dec. 8, 2017, Retrieved on Jun. 26, 2022 from <https://www.fda.gov/files/medical%20devices/publish_ed/Software-as-a-Medical-Device-%28SAMD%29-Clinical-Evaluation-Guidance-for-Industry-and-Food-and-Drug-Administration-Staff.pdf> entire document.

Teyhouee, "Cough Detection Using Hidden Markov Models" arxiv. Arxiv.org. Apr. 28, 2019 DOI: ARxIV:1904.12354v1.

International Search Report in International Application No. PCT/US2022/019851 mailed Jul. 20, 2022.

Ashby, "A Novel Cough Audio Pre-Processing and Segmentation Algorithm for COVID-19 Detection," University of Brighton, School of Architecture, Technology and Engineering, Bachelor of Science Thesis, Jun. 2, 2022, www.researchgate.net/profile/Alice-Ashby/publication/363057325.

Ashby et al., "Cough-Based COVID-19 Detection with Audio Quality Clustering and Confidence Measure Based Learning," Conformal and Probabilistic Prediction with Applications, Proceedings of Machine Learning Research, pp. 129-148, Aug. 30, 2022.

Zhang et al., "Novel COVID-19 Screening Using Cough Recordings of a Mobile Patient Monitoring System," 2021 43rd Annual International Conference of the IEEE Engineering in Medicine & Biology Society (EMBC). IEEE, pp. 2353-2357, Nov. 7, 2021.

International Search Report in International Application No. PCT/US2023/066888 mailed Jan. 24, 2024.

International Search Report in International Application No. PCT/US2023/066864 mailed Sep. 13, 2023.

International Search Report in International Application No. PCT/US2023/066888 mailed Sep. 18, 2023.

International Search Report in International Application No. PCT/US2023/072499 mailed Dec. 12, 2023.

Alqudaihi et al., "Cough Sound Detection and Diagnosis Using Artificial Intelligence Techniques: Challenges and Opportunities", IEEE Access, vol. 9, pp. 102327-102344 (Year: 2021). OA Mar. 7, 25.

He et al., "Read, Watch, and Move: Reinforcement Learning for Temporally Grounding Natural Language Descriptions in Videos", Proceedings of the AAAI Conference on Artificial Intelligence, vol. 33, No. 1, pp. 8393-8400, Jul. 17, 2019. OA of Feb. 13, 2025.

(56) References Cited

OTHER PUBLICATIONS

Huang et al., "SAP: Self-Adaptive Proposal Model for Temporal Action Detection Based on Reinforcement Learning", Proceedings of the AAAI Conference on Artificial Intelligence, vol. 32, No. 1, pp. 6951-6958, Apr. 27, 2018. OA of Feb. 13, 2025.
Ratri et al., "A Comparative Study on Signature Recognition", IEEE, pp. 167-171, Nov. 8, 2014. Retrieved from the Internet: Ratri et al., "A Comparative Study on Signature Recognition", IEEE, https://ieeexplore.ieee.org/stamp/stamp.jsp?tp=&arbynber=7065735.
Brownlee: A Gentle Introduction to Imbalanced Classification (Year: 2020).
Chen: When Machine Learning Meets Blockchain 2018 (Year: 2018).
Guha: One Shot Federated Learning 2019 (Year: 2019).
Herresthal: Swarm Learning for Decentralized Confidential Clinical ML May 2021 (Year: 2021).
Herresthal: Swarm Learning privacy ML Disease Classification_2020 (Year: 2020).
Jackson: City of Jackson COVID19 Symptom Collector Chrysalis Partners Apr. 2020 (Year: 2020).
Jadon: What Happens When You Run a Computer Program 2020 Loading Programs into RAM (Year: 2020).
Kolding: Chrysalis Partners Launches Covid19 Symptom Collector_Apr. 2020 (Year: 2020).
Li: Explicit Inductive Bias for Transfer Learning CNNs 2018 (Year: 2018).
Liu: Bagging based ensemble transfer learning 2016 (Year: 2016).
Liu: Cough Detection Using Deep Neural Networks 2014 (Year: 2014).
Merriam Webster: Compendium Definition & Meaning 2024 (Year: 2024).
Tan: A Survey on Deep Transfer Learning 2018 (Year: 2018).
Weiss: A survey of transfer learning 2016 (Year: 2016).
Zhuang: Comprehensive Survey on Transfer Learning 2020 (Year: 2020).

* cited by examiner

SYSTEMS AND METHODS FOR AUTHENTICATION USING SOUND-BASED VOCALIZATION ANALYSIS

CROSS-REFERENCE TO RELATED APPLICATIONS

This application claims priority to U.S. Provisional Application 63/159,305, entitled "Systems and Methods for Authentication Using Sound-Based Vocalization Analysis" and filed Mar. 10, 2021, which is incorporated by reference herein in its entirety.

FIELD OF TECHNOLOGY

The present disclosure generally relates to computer-based systems configured for sound-based machine learning sound signal data signature analysis and methods of use thereof.

BACKGROUND OF TECHNOLOGY

Early detection of potential respiratory safety issues is key to managing the severity of health and safety risks. Security technology may be a helpful tool to protect and serve our families like we protect and serve our communities every day. Currently, security technology does not include any solution for providing early warnings to potential respiratory threats or alternative biometric authentication techniques using sound.

SUMMARY OF DESCRIBED SUBJECT MATTER

Systems and methods of the present disclosure enable a safety application, designed to very precisely compare a current signal data signature to a previous sound signal data signature standard previously established, called a baseline sound signal data signature representing the normal sound signal data signature. To create a baseline, the systems and methods include requesting a user to perform a vocalization (e.g., a forced cough vocalization) a number of times, such as three times over a given period of time, such as an 18-to-24 hour period. The systems and methods combines recordings of each of the vocalizations into a personal sound signal data signature baseline. After that baseline is established, any time the user may want to check for potential respiratory anomalies, the user may record a new vocalization. That new vocalization may be compared to the baseline. If there are no changes, the new vocalization may be considered authenticated, in other words, it matches the baseline. If the new vocalization cannot be matched or authenticated, the user may be alerted as such. Vocalizations that do not match the baseline may provide an early warning and may help protect others.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

In some embodiments, a sound signal data signature analysis platform and area-based sound signal data signature analysis platform are disclosed. The sound signal data signature analysis platform and area-based sound signal data signature analysis platform are AI-encapsulated, AI-based Biometric Software as Security Devices (SaSD) for detecting biometric change agnostic of the reason of the change. Using a set of AI Quality assurance classifiers, the sound signal data signature analysis platform and area-based sound signal data signature analysis platform able to slice and dice any incoming data stream so that only high-quality audio files are evaluated by the AI-based model, hence the term AI-encapsulated. Leveraging global audio unsupervised and semi-supervised learning techniques fully characterizes the majority of data attributes. High-quality audio files may be sent to the AI-encapsulated, AI-based biometric SaSD which may include of a set of classifiers and/or deep neural networks which return biometric authentication, biometric non-authentication, or inconclusive. Audio files can be ensured as high-quality audio files using cleansing, filtering and/or normalizing processes. For example, background noise may be filtered from a sample including one or more recordings of a vocalization, and then the vocalization with the recording(s) can be identified, e.g., using a Pretrained Audio Neural Network (PANN) or other detection/recognition tools or any combination thereof. Thus, audio samples that do not contain a vocalization may be prevented from being processed by the system to avoid unnecessary resource utilization.

FIGS. 1 through 28 illustrate systems and methods of forced sound signal data signature analysis as a biometric indicator user authentication and/or of potential respiratory anomalies based on machine learning techniques for the establishment of a baseline sound signal data signature and for comparison of new sound signal data signatures to the baseline sound signal data signature. The following embodiments provide technical solutions and technical improvements that overcome technical problems, drawbacks and/or deficiencies in the technical fields involving detection of respiratory anomalies without invasive testing, which is slow, expensive and inconvenient. As explained in more detail, below, technical solutions and technical improvements herein include aspects of improved accuracy and speed of respiratory anomaly identification, availability and cost of detection of respiratory anomalies, monitoring, tracking and tracing respiratory anomalies, among others. Based on such technical features, further technical benefits become available to users and operators of these systems and methods. Moreover, various practical applications of the disclosed technology are also described, which provide further practical benefits to users and operators that are also new and useful improvements in the art.

Figure 1:
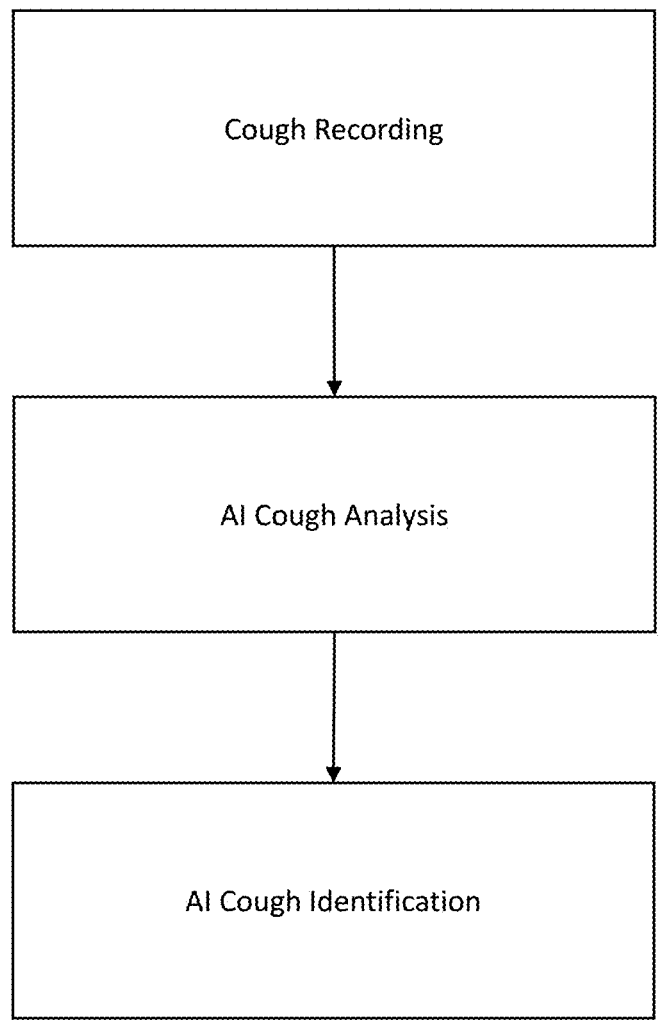
FIG. 1 illustrates a flowchart of an illustrative methodology for sound signal data signature analysis utilizing machine learning in accordance with one or more embodiments of the present disclosure.

FIG. 1 illustrates a flowchart of an illustrative methodology for sound signal data signature analysis utilizing machine learning in accordance with one or more embodiments of the present disclosure.

Each human being has a very distinct forced non-speech vocalization (aka fake cough) that technology can measure and identify as your baseline sound signal data signature. By analyzing a sound signal data signature against a pre-recorded baseline sound signal data signature, some embodiments may provide an early warning if the sound signal data signature no longer matches the baseline sound signal data signature.

Accordingly, in some embodiments, identifying potential respiratory anomalies for early warning using sound signal data signatures may include a sound signal data signature recording step, an artificial intelligence (AI) driven sound signal data signature analysis to determine the sound signal data signature, and an AI driven sound signal data signature identification to identify whether the sound signal data signature matches a baseline sound signal data signature.

In some embodiments, the illustrative computer-based sound signal data signature analysis systems may be configured to utilize one or more exemplary AI or machine learning techniques chosen from, but not limited to, probabilistic modelling, deep learning modelling, regression modelling, clustering, dimensionality reduction, among other forms of modelling. In some embodiments, the sound signal data signature analysis system may include a probabilistic approach to determine a probability of a match of an input recording to a baseline signature, such as, e.g., Bayesian or non-Bayesian modeling using, e.g., a Gaussian model, a Gaussian mixture model, a hierarchical Bayesian model, among others or any combination thereof.

In some embodiments, the sound signal data signature analysis system may alternatively or in addition employ learning models, such as, e.g., autoencoders (e.g., variational autoencoder (VAE), etc.), decision trees, boosting, support-vector machines, neural networks, nearest neighbor algorithms, Naive Bayes, bagging, random forests, and the like. In some embodiments and, optionally, in combination of any embodiment described above or below, an exemplary neural network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) define architecture/model,
ii) transfer the input data to the exemplary model,
iii) train the exemplary model incrementally,
iv) determine the accuracy for a specific number of timesteps,
v) apply the exemplary trained model to process the newly-received input data, and
vi) optionally and in parallel, continue to train the exemplary trained model with a predetermined periodicity.

In some embodiments and, optionally, in combination of any embodiment described above or below, the exemplary trained model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, users may utilize a software application, such as, e.g., a native application, a web application, a browser page, or any other suitable application ("app") or any combination thereof. The users may download or otherwise access the app and submit a recording of a sound signal data signature to a computing device, such as, e.g., a personal computing device or computing system (e.g., laptop computer, desktop computer, etc.), a mobile computing device (e.g., a smartphone, tablet, wearable, etc.), a cloud service, or other computing device or computing system to establish a baseline. In some embodiments, to establish the baseline sound signal data signature, the user may submit sound signal data signatures multiples times over the course of a day, such as, e.g., two times, three times, five times, or other suitable number of times. Thereafter, a baseline sound signal data signature may be determined from the multiple sound signal data signatures such that a new sound signal data signature can be tested against the baseline sound signature. For example, prior to entering a home, an educational facility, a hospital, clinic, business, office, laboratory, public event (e.g., sporting event, concert, performance, expo, etc.) or anywhere, the user may submit another sound signal data signature. The AI/ML technology assesses whether or not the newly submitted sound signal data signature matches the baseline. Sounds that do not match the baseline provide an early warning system for potential respiratory anomalies and action can be taken to prevent the spread of any communicable conditions.

In some embodiments, to support building security and access control systems, this admittance safety tool has both personal and professional applications. The AI technology assesses whether the newly submitted sound signal data signature matches or does not match the baseline. Premise operators may use the tools to control access to their facilities, allowing users who receive match codes to enter, while routing non-match users to other resources or further screening. In some embodiments, non-matches indicate a change from the person's biometric baseline that may represent risk to the premises or the public, regardless of cause for the change (i.e., agent unknown).

Figure 2:
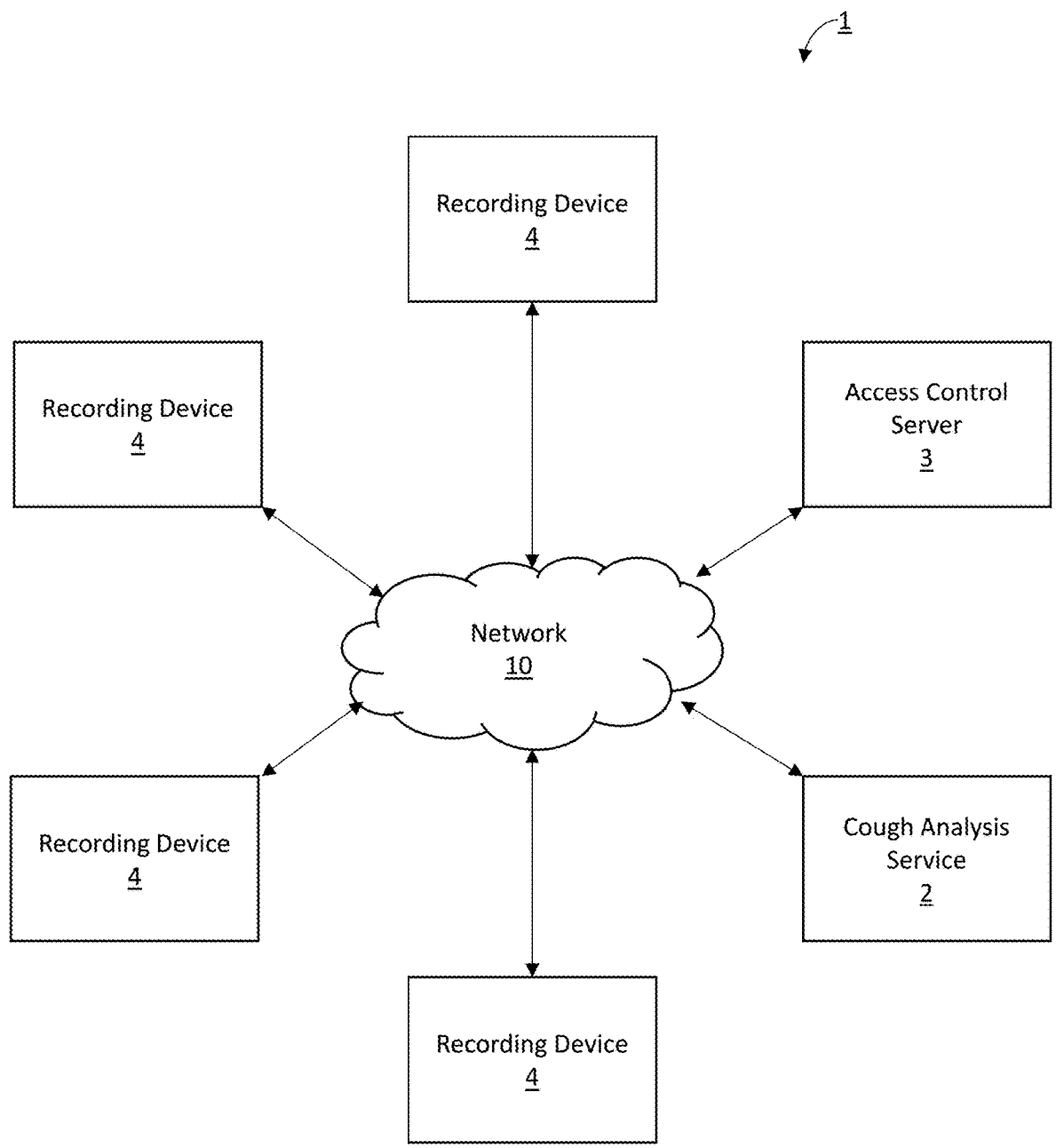
FIG. 2 is a block diagram of an exemplary computer-based system for sound signal data signature analysis for vocalization-based authentication utilizing machine learning in accordance with one or more embodiments of the present disclosure.

FIG. 2 is a block diagram of an exemplary computer-based system for sound signal data signature analysis for early warning of respiratory anomalies utilizing machine learning in accordance with one or more embodiments of the present disclosure.

In some embodiments, when a person produces forced non-speech vocalizations, the sound created has a signature as unique as a fingerprint. In some embodiments, using sophisticated artificial intelligence and machine learning (AI/ML), the sound signal data signature analysis service 2 learns the unique sound signal data signature of each user. The sound signature is then securely stored as that user's baseline for future comparison.

Accordingly, in some embodiments, a sound signal data signature analysis platform 1 may employ the sound signal data signature analysis service 2 to analyze sound signal data signatures from one or more recording devices 4, e.g., via a network 10. In some embodiments, the network 10 may include any suitable computer network, including, two or more computers that are connected with one another for the purpose of communicating data electronically. In some embodiments, the network 10 may include a suitable network type, such as, e.g., a local-area network (LAN), a wide-area network (WAN) or other suitable type. In some embodiments, a LAN may connect computers and peripheral devices in a physical area, such as a business office, laboratory, or college campus, by means of links (wires, Ethernet cables, fiber optics, wireless such as Wi-Fi, etc.) that transmit data. In some embodiments, a LAN may include two or more personal computers, printers, and high-capacity disk-storage devices called file servers, which enable each computer on the network 10 to access a common set of files. In some embodiments, the network 10 may include, e.g., a network of networks, such as devices on a LAN networked with other LANs or one or more WANs, such as, e.g., the Internet. In some embodiments, a WAN may connect computers and smaller networks to larger networks over greater geographic areas. A WAN may link the computers by means of cables, optical fibers, or satellites, or other wide-area connection means. In some embodiments, an example of a WAN may include the Internet.

In some embodiments, the sound signal data signature analysis service 2 may be implemented using any suitable computing device or computing system or both. For example, the sound signal data signature analysis service 2 may include, e.g., a server or server system. In some embodiments, a server refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

Once in place, users can check their current forced sound signal data signature anytime to see if it matches their baseline. Conditions that can alter a baseline forced sound signal data signature include illness and environmental exposure, among others. If the signature is the same, the user gets an "Authenticated" message. If the signatures do not match, the user gets a "Not Authenticated" message, providing an early warning of a possible problem.

In some embodiments, sound signal data signature analysis platform 1 includes both user-specific and area based sound signal data signature analysis, and are AI-encapsulated, AI-based Biometric Software as Security Devices (SaSD) for detecting biometric change agnostic of the reason of the change. In some embodiments, a specialized set of AI Quality assurance classifiers is able to slice and dice any incoming data stream so that only high-quality audio files are evaluated by the AI-based models, hence the term AI-encapsulated.

In some embodiments, in addition, the sound signal data signature analysis service 2 may include a full ML monitoring system that includes a visual navigation system. The visual navigation system allows millions of audio files to be visualized and clustered in high-dimensional space. The incoming data-stream is transformed into a feature vector and projected into this high-dimensional space such that it is fully characterized using an unsupervised and/or semi-supervised learning based off of the millions of audio feature vector data points from a training dataset such that all data attributes are automatically characterized.

In some embodiments, once a high-quality audio file is identified it may be transformed into an image file or spectrogram using specialized processing tools and approaches. In some embodiments, a specialized set of filter banks that capture the frequency signatures and time concordance of the audio files are used to create a distinctive feature set. The feature set is fed into the AI-based biometric SaSD and a label of biometric authentication, biometric non-authentication, or inconclusive is returned as output and displayed on a hardware device display screen.

Agnostic Threat Biometric Perimeter Security Device:

In the world of perimeter security and environmental security sensors, threat specific electronic sensors have dominated the marketplace. All currently available biometric safety devices as well as environmental "sniffers" are based on the ability of the technology to identify a known threat or toxin electronically. In some embodiments, the sound signal data signature analysis platform 1 is threat agnostic. In short, threat agnostic sensors have no requirement to know the type of threat or even the category of threat. Instead, these biometric SaSDs use the changes in the biometrics of the user and when found, sound the alarm. As a detection method for change on the basis of "ME"/"NOT ME". The biometric of choice for the sound signal data signature analysis platform 1 and the sound signal data signature analysis service 2 are forced sound signal data signature vocalization resonance patterns.

In some embodiments, forced sound signal data signature vocalization resonance pattern are unique to each user. Alterations in that resonance pattern can arise from any number of internal or external factors, all signifying the user is no longer "ME" compared to their baseline. This is what is referred to in the securities industry as a "Glass-Break" event. Upon detecting a "glass-break" event, a device on the network 10 in communication with the sound signal data signature analysis server 2 may advise the user and/or premises owner that a "glass-break" event has occurred, and that the sound signal data signature source can no longer be authenticated as "ME". This has great significance in the protection of governmental buildings, criminal justice buildings, law enforcement facilities, military bases, healthcare institutions and other hard and soft targets. In some embodiment, the sound signal data signature analysis platform 1 adds an additional layer to existing security systems. In some embodiment, the sound signal data signature analysis platform 1 have a much has a much broader sensitivity to new and emerging threats compared to traditional methods of respiratory anomaly and other threat detection. The portability of a biometric SaSD enables any user with a mobile device to have such a device on their personal mobile device. This level of perimeter protection extends to the individual where they live, work, shop, learn, play, worship, and even travel.

Access Control Architecture

In some embodiments, the sound signal data signature analysis service 2 may receive sound signal data signatures from the recording devices 4 and provide the access control service 110 to analyze each sound signal data signature against a baseline sound signal data signature specific to each user. In some embodiments, each baseline sound signal data signature may include a set of multiple prior sound signal data signatures submitted by each user that are used to form a probabilistic model or other suitable unsupervised learning model. Thus, the spectral image for the received sound signal data signatures may be compared to the spectral images representing the baseline sound signal data signature for each user.

In some embodiments, the sound signal data signature analysis platform 1 may provide a personal safety solution that can be used by anyone, anywhere, throughout the day to conduct self-checks. First, users may submit a series of forced sound signal data signature to establish a baseline. Once the baseline is established, users may produce a forced sound signal data signature using the app at any time, and the app may compare the current forced sound signal data signatures to the baseline. If the signature is the same, the user gets an "Authenticated" message. If the signatures do not match, the user gets a "Not Authenticated" message, providing an early warning of a possible problem.

In some embodiments, the results from the sound signal data signature analysis service 2 may be used for multiple use cases where authentication via sound signal data signatures may be advantageous, such as in health contexts and/or to authenticate an identity of an individual, or any other suitable user or any combination thereof. For example, individuals and families may receive alerts from the sound signal data signature analysis service 2 as an early warning for an individual's sound signal data signature indicating a potential anomaly.

In another example, entry into buildings, businesses, facilities, venues or other locations may be controlled according to authentication of sound signal data signatures. Thus, an access control server 3 in communication with the sound signal data signature analysis service 2 may receive the authentication or failure to authenticate a sound signal data signature to deny access to the associated user.

In some embodiments, the access control server 3 may include further functionality to authenticate users. For example, the access control server 3 may utilize a code scanning feature, such as a quick response (QR) code, linear barcode, or other code scanner. A user may test a sound signal data signature via a recording device 4 and receive on a user computing device an indication of authentication or non-authentication of the sound signal data signature from the sound signal data signature analysis service 2.

In some embodiments, a computing device associated with a premises operator may be in communication with the access control server 3. In some embodiments, the computing device may receive authentication data regarding the authentication or non-authentication of the sound signal data signature via a suitable encoding, such as, e.g., a barcode, a QR code, wirelessly transmitted data (e.g., via Bluetooth, WiFi, Zigbee, Z-Wave or other wireless communication protocol), or wired data transmission. The access control server 3 or a computing device in communication therewith may scan a code presented on a screen of the user computing device as the indication of authentication or non-authentication of the sound signal data signature. In some embodiments, the access control server 3 may compare data extracted from the code, including the sound signal data signature authentication and/or any other suitable data (e.g., user identity data, location data, user profile data, etc.) to verify the user for access to an area. Thus, the access control server 3 may control access by the user in a fast, inexpensive, and easy to activate manner. In some embodiments, the access control server 3 may be configured to support the protocols already in place for the safety of customers, employees, and clients.

Figure 3:
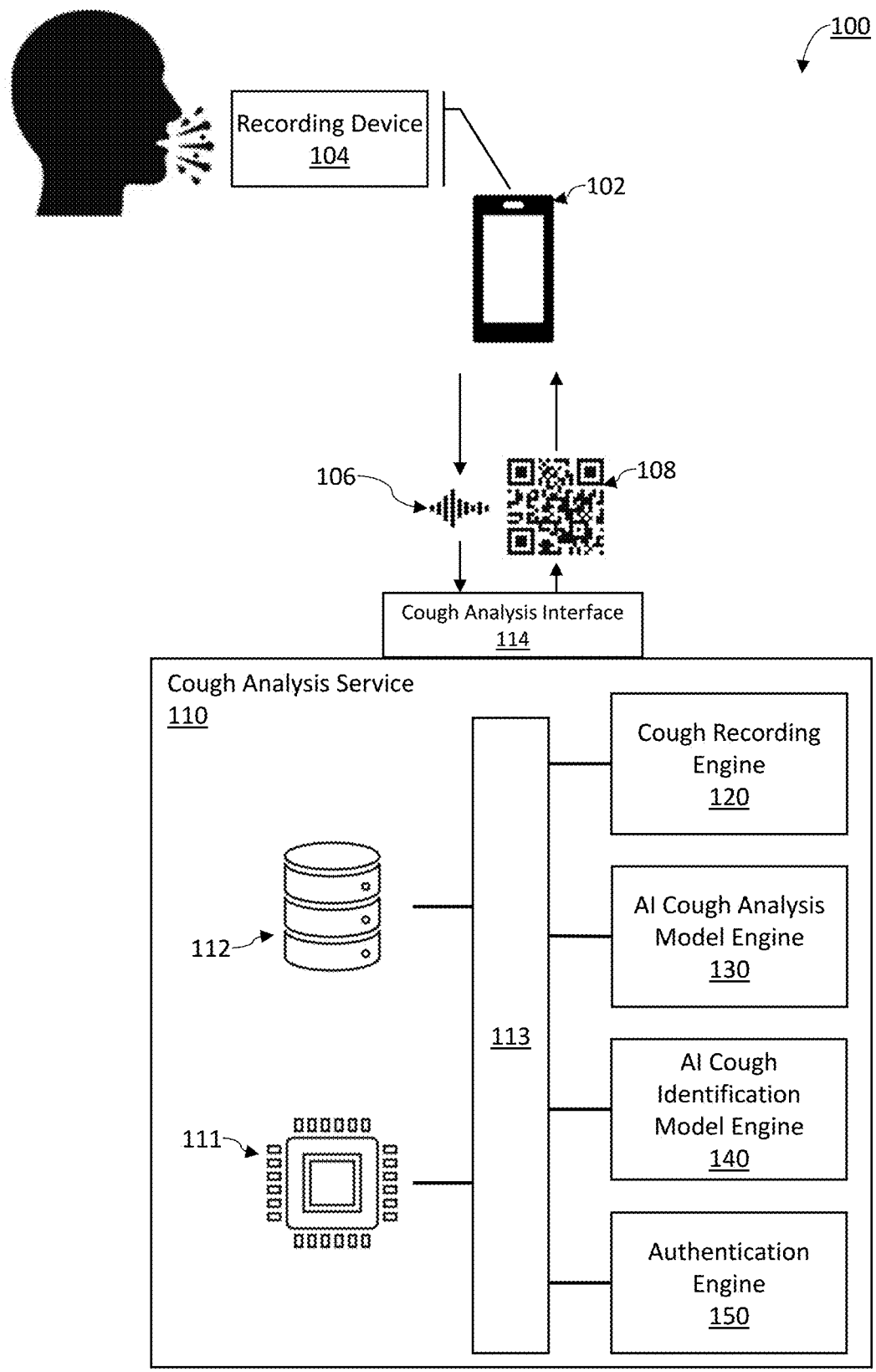
FIG. 3 depicts an illustrative computer-based system for sound signal data signature analysis including a sound signal data signature analysis service that receives sound signal data signatures from a user computing device according to embodiments of the present disclosure.

FIG. 3 depicts an illustrative computer-based system for sound signal data signature analysis including a sound signal data signature analysis service that receives sound signal data signatures from a user computing device according to embodiments of the present disclosure.

In some embodiments, a user may record a sound signal data signature using a recording device 104 of a user computing device 102. For example, the user computing device 102 may include one or more microphones and a software application configured to use the microphones for recording sounds. However, in some embodiments, the recording device 104 may be a peripheral or connected device connected to the user computing device 102, and the user computing device 102 may include a software application configured to receive or obtain a recording from the recording device 104.

In some embodiments, the sound signal data signature may include a forced non-speech vocalization, such as, e.g., a cough. As described above, a sound signature of a forced non-speech vocalization is unique to each individual. Thus, the user computing device 102 may instruct the user to force a cough vocalization as a way to authenticate a user's identity. The sound signal data signature may also be used to assess changes to the sound signature of the user's sound signal data signature by, e.g., comparing the sound signal data signature to a baseline signature. Thus, the sound signal data signature may be employed to assess any potential changes to the user's sound signal data signature that may indicate a potential respiratory anomaly.

In some embodiments, the sound signal data signature analysis service 110 may be configured to receive the forced cough vocalization 106 and compare a signature thereof to a baseline signature in order to identify anomalous sound signal data signatures may provide more efficient early warning and screening for any anomaly inducing factor, improving the speed, efficiency, cost and access to quickly recognizing and mitigating the anomaly inducing factor.

Accordingly, in some embodiments, the user computing device 102 may provide the forced cough vocalization 106 recorded by the recording device 104 to the sound signal data signature analysis service 110, e.g., via a sound signal data signature analysis interface 114. In some embodiments, the sound signal data signature analysis interface 114 may include any suitable interface for data communication over, e.g., a network (e.g., network 10 described above), or via local or direct data communication infrastructure. For example, in some embodiments, the sound signal data signature analysis interface 114 may include wired interfaces such as, e.g., a Universal Serial Bus (USB) interface, peripheral component interconnect express (PCIe), serial AT attachment (SATA), or any other wired interface, or wireless interfaces such as, e.g., Bluetooth™ near-field wireless communication (NFC), RFID, Narrow Band Internet of Things (NBIOT), 3G, 4G, 5G, GSM, GPRS, WiFi, WiMax, CDMA, satellite, ZigBee, or other wireless interface, or any combination of any wired and/or wireless interfaces. In some embodiments, the user computing device 102 may communicate the forced cough vocalization 106 via the sound signal data signature analysis interface 114 using any suitable data communication protocol, such as, e.g., IPX/SPX, X.25, AX.25, AppleTalk™, TCP/IP (e.g., HTTP), application programming interface (API), messaging protocol or any combination thereof.

In some embodiments, the sound signal data signature analysis interface 114 may include, e.g., an application programming interface. In some embodiments, "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the sound signal data signature analysis service 110 may receive the forced cough vocalization 106 and analyze the forced cough vocalization 106 to determine a sound signal data signature recording of the sound signal data signature isolated from noise and artifacts of in the recorded forced cough vocalization 106, generate a signature for the sound signal data signature recording, a compare the signature to a baseline signature. In some embodiments, the sound signal data signature analysis service 110 may be a part of the user computing device 102. Thus, the sound signal data signature analysis service 110 may include hardware and software components including, e.g., user computing device 102 hardware and software, cloud or server hardware and software, or a combination thereof.

In some embodiments, the sound signal data signature analysis service 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the sound signal data signature analysis service 110 may include storage 112, such as local hard-drive, solid-state drive, flash drive, database or other local storage, or remote storage such as a server, mainframe, database or cloud provided storage solution. In some embodiments, the data storage solution of the storage 112 may include, e.g., a suitable memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, the sound signal data signature analysis service 110 may implement computer engines, including a sound signal data signature recording engine 120 to determine a sound signal data signature recording of the sound signal data signature isolated from noise and artifacts of in the recorded forced cough vocalization 106, an AI sound signal data signature analysis model engine 130 to leverage machine learning models generate a signature for the sound signal data signature recording, an AI sound signal data signature identification model engine 140 to leverage machine learning models compare the signature to a baseline signature to identify potentially anomalous sound signal data signatures, and an authentication engine 150 to generate an authentication determination of the user based on deviations for the signature of the sound signal data signature recording from the baseline signature. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to determine a sound signal data signature recording of the sound signal data signature isolated from noise and artifacts of in the recorded forced cough vocalization 106, the sound signal data signature analysis service 110 may include computer engines including, e.g., the sound signal data signature recording engine 120. In some embodiments, the sound signal data signature recording engine 120 may include dedicated and/or shared software components, hardware components, or a combination thereof. For example, the sound signal data signature recording engine 120 may include a dedicated processor and storage. However, in some embodiments, the sound signal data signature recording engine may share hardware resources, including the processor 111 and storage 112 of the sound signal data signature analysis service 110 via, e.g., a bus 113.

In some embodiments, to leverage machine learning models generate a signature for the sound signal data signature recording, the sound signal data signature analysis service 110 may include computer engines including, e.g., the AI sound signal data signature analysis model engine 130. In some embodiments, the AI sound signal data signature analysis model engine 130 may include dedicated and/or shared software components, hardware components, or a combination thereof. For example, the AI sound signal data signature analysis model engine 130 may include a dedicated processor and storage. However, in some embodiments, the AI sound signal data signature analysis model engine 130 may share hardware resources, including the processor 111 and storage 112 of the sound signal data signature analysis service 110 via, e.g., a bus 113.

In some embodiments, to leverage machine learning models compare the signature to a baseline signature to identify potentially anomalous sound signal data signatures, the sound signal data signature analysis service 110 may include computer engines including, e.g., the AI sound signal data signature identification model engine 140. In some embodiments, the AI sound signal data signature identification model engine 140 may include dedicated and/or shared software components, hardware components, or a combination thereof. For example, the AI sound signal data signature identification model engine 140 may include a dedicated processor and storage. However, in some embodiments, the AI sound signal data signature identification model engine 140 may share hardware resources, including the processor 111 and storage 112 of the sound signal data signature analysis service 110 via, e.g., a bus 113.

New Sound Signal Data Signature Analysis

In some embodiments, to generate an authentication determination of the user based on deviations for the signature of the sound signal data signature recording from the baseline signature, the sound signal data signature analysis service 110 may include computer engines including, e.g., the authentication engine 150. In some embodiments, the authentication engine 150 may include dedicated and/or shared software components, hardware components, or a combination thereof. For example, the authentication engine 150 may include a dedicated processor and storage. However, in some embodiments, the authentication engine 150 may share hardware resources, including the processor 111 and storage 112 of the sound signal data signature analysis service 110 via, e.g., a bus 113.

In some embodiments, the sound signal data signature analysis system 100 may be a software as security device (SaSD) that includes, e.g., five components that in combination, make up a unique biometric SaSD.

In some embodiments, the first component is the mobile device application on the user computing device 102. In some embodiments, the mobile device application may exist as a native Android application, a native iOS application, a native Windows application, and/or a web client application or any other suitable application or any combination thereof. The mobile application records audio at a suitable bit rate and bit depth, such as, e.g., 32 bit float 48 k bit full spectrum sound, and sends that sound to, e.g., a server configured as the sound signal data signature analysis service 110, as an uncompressed file, as a compressed lossless file, as a compressed lossy file, or according to any suitable file type and file format or any combination thereof.

Figure 4A:
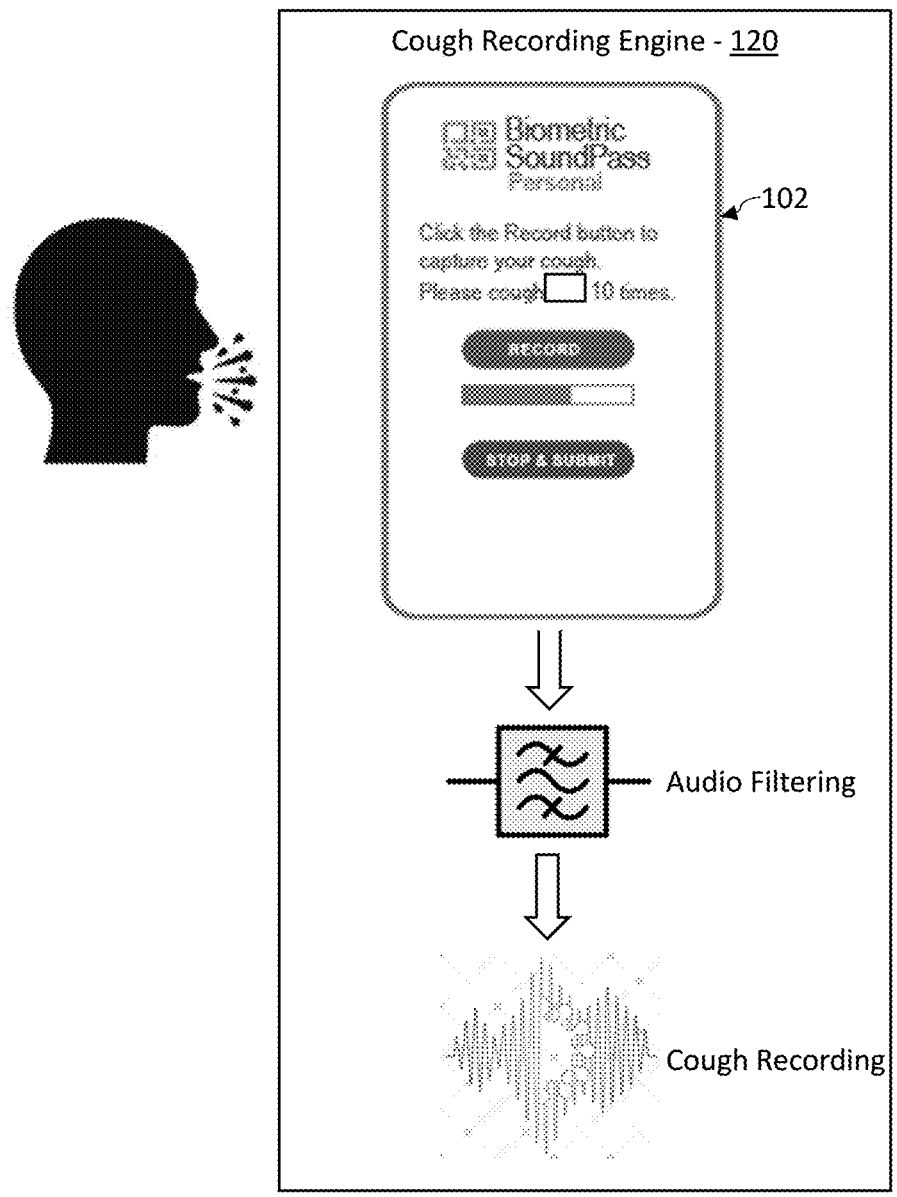
FIG. 4A depicts an illustrative computer-based system for sound signal data signature analysis including a user computing device configured to record sound signal data signatures of a user according to embodiments of the present disclosure.
Figure 4B:
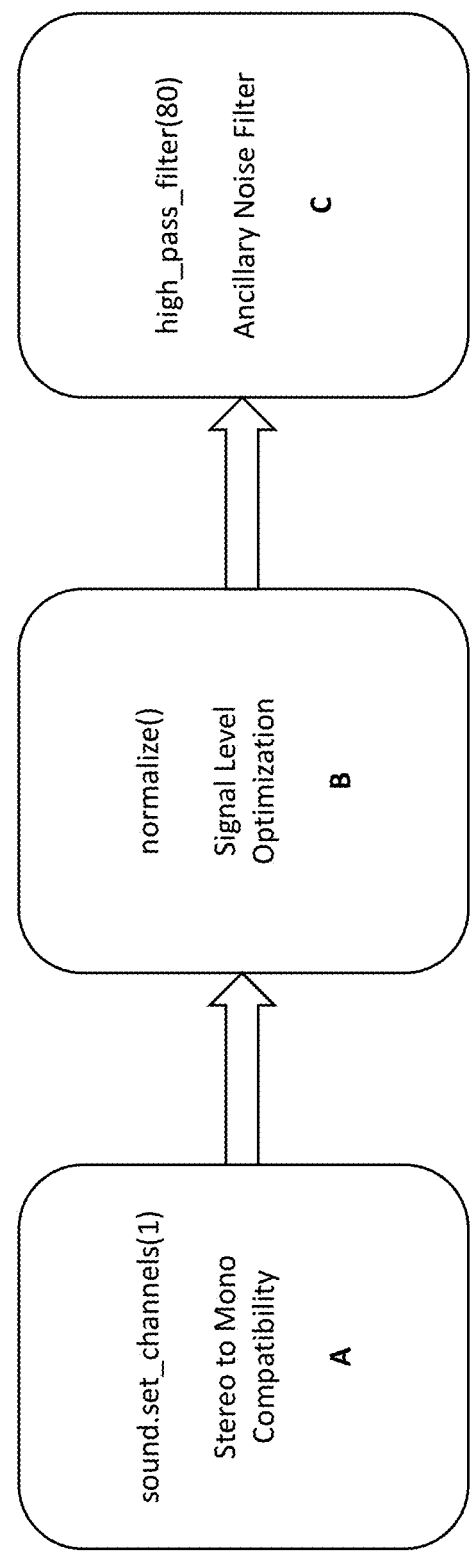
FIG. 4B depicts an example of signal data source pre-processing filters "Audio Filters" which implement audio digital signal processing techniques with the purpose of standardizing the overall quality of the signal data source according to embodiments of the present disclosure.

In some embodiments, the sound signal data signature recording engine 120 of the sound signal data signature analysis service 110 servers receive and record the sound file (e.g., the forced cough vocalization 106), and then place it through a series of audio filters to force mono compatibility, standardize signal level and remove ancillary noise as illustrated in FIG. 4A ("audio filtering") and FIG. 4B ("Audio Filtering Examples"). Additionally, any other suitable filters may be employed for signal quality optimization, such as one or more filters for, e.g., dynamic range modification (e.g., via dynamic range compression or expansion), optimization of signal to noise ratio, removal, suppression or other mitigation of ancillary noise(s), implement bandlimiting to isolate frequency content within a range of interest (e.g., via resampling or the use of equalization filters), among other signal optimizations or any combination thereof. In some embodiments, these audio filters comprise the second component in the sound signal data signature analysis system 100 SaSD.

Figure 5:
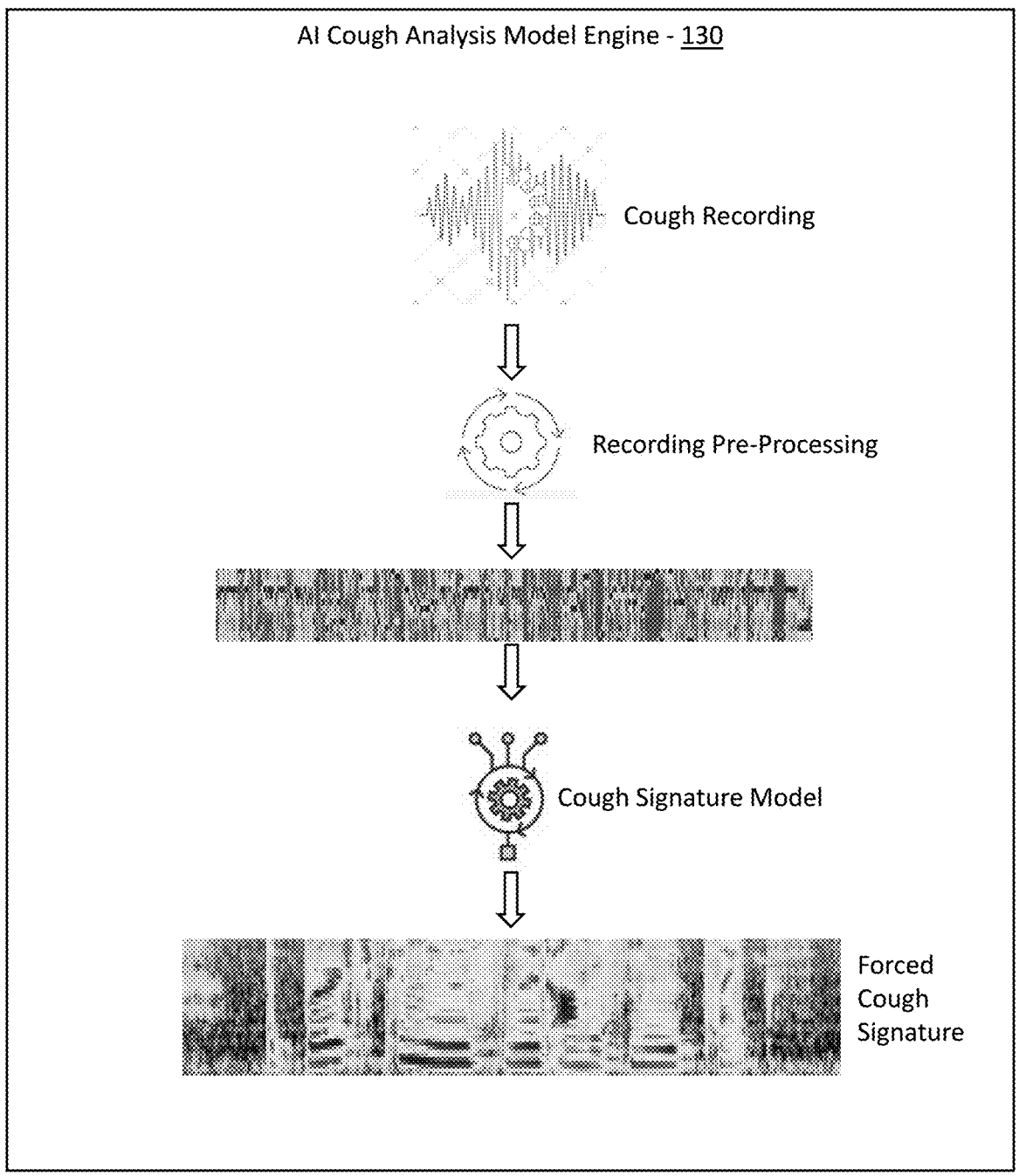
FIG. 5 depicts an illustrative AI sound signal data signature analysis model engine of the sound signal data signature analysis service for sound signal data signature analysis according to embodiments of the present disclosure.

In some embodiments, after filtering the sound signal data signature file is passed to a Hidden Markov Model (HMM) classifier ensemble of the AI sound signal data signature analysis model engine 130 to function as an AI sound detector as depicted in FIG. 5. In some embodiments, this sound detector may be trained, utilizing calibration quality professionally audio engineered sound source libraries to differentiate a forced non-speech vocalization from other vocal and non-vocal sounds. The HMM sound detector provides a probability score that the that the incoming sound is a match to the target sound source library and not a match to the not target sound source library.

Figure 6:
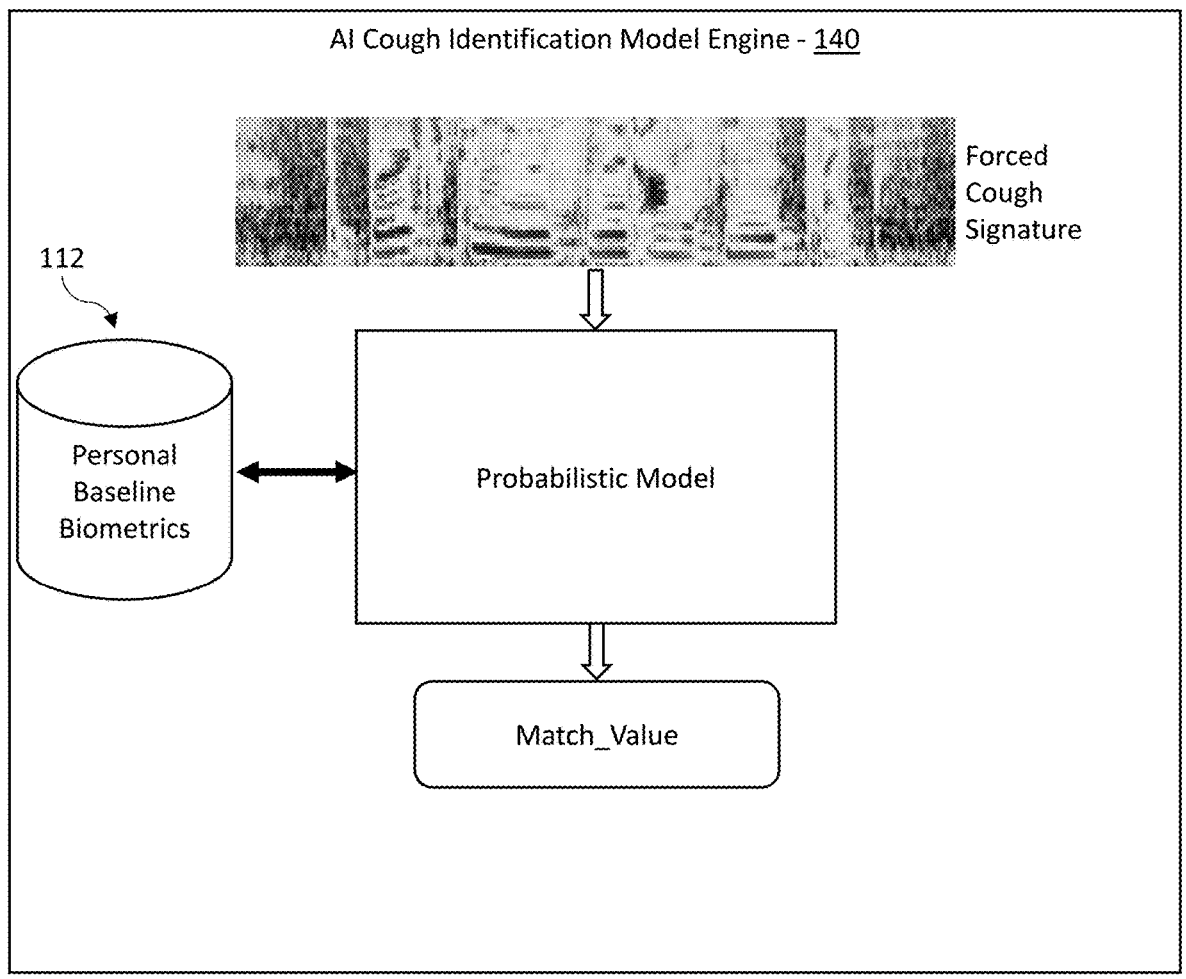
FIG. 6 depicts an illustrative AI sound signal data signature identification model engine of the sound signal data signature analysis service for sound signal data signature analysis according to embodiments of the present disclosure.

In some embodiments, the sounds above the threshold for match are then passed to a classifier, such as a probability model classifier such as, e.g., a Gaussian Mixture Model (GMM) classifier, of the AI sound signal data signature identification model engine 140 as illustrated in FIG. 6. The GMM classifier utilizes a baseline set of recordings, e.g., stored in the storage 112, for each individual user to determine a match value for a challenge, aka match file. In some embodiments, the match value determined by the GMM is used to determine whether or not the match file has a probability of belonging to that user's baseline match value cluster.

In some embodiments, when a user submits the forced cough vocalization 106, e.g., via a match file for authentication, that match file is processed by the GMM classifier against the multiple baseline recordings (e.g., 2, 3, 4, 5, 6, 7, 8, 9, 10 or more) to produce a match value for the match file. The match value for the match file must then fall between the upper and lower confidence levels previously calculated in the match file to be determined to belong to the user's cluster. Those match files with a match value that are found to belong to the baseline match value cluster for the user are determined to be authentications, those that are not within that range are determined to be not authentications. Any file with that is unable to be classified by the GMM is rejected for resubmission. In some embodiments, the authentication engine 150 analyzes the baseline match value cluster to generate an authentication determination for the match file of the forced cough vocalization 106.

In some embodiments, upon the sound signal data signature identification based on the baseline signature, the authentication engine 150 may determine whether to provide authentication for the user to authentication the forced cough vocalization 106. In some embodiments, where the forced cough vocalization 106 matches the baseline signature, the authentication engine 150 may generate a QR code 108 indicating an authentication. In some embodiments, where the forced cough vocalization 106 fails to match the baseline signature, the authentication engine 150 may generate a QR code 108 indicating a not authenticated sound signal data signature. In some embodiments, the authentication engine 150 may generate the QR code 108 to encode the authentication determine as well as any additional authentication and/or access control data attributes, such as, e.g., a user ID, a user profile ID, a user photo identification, a key-value, a time of authentication, a location of authentication, or any other data attributes or any combination thereof.

In some embodiments, an access control software application provides an additional layer of authentication by displaying a QR code 108 for verification using the access control software application module. The QR code 108 provides a unique identifier, time and date stamp of authentication, and a URL key that allows for validation of the authentication with the access control software application.

Baseline Collection

In some embodiments, the baseline match value cluster may be established at setup where the sound signal data signature analysis service 110 collects multiple baseline sound signal data signatures (e.g., two, three, five, six, less than six, more than six or other suitable number) according to the process described above. For example, the sound signal data signature analysis service 110 may collect sound signal data signatures from the user computing device 102, perform audio analysis to isolate and extract the sound signal data signature records using the audio filters of the sound signal data signature recording engine 120, generate sound signal data signatures for each sound signal data signature using the HMM sound detector of the AI sound signal data signature analysis model engine 130, and classify each sound signal data signature by computing match values with the GMM classifier of the AI sound signal data signature identification model engine 140. In some embodiments, the cluster formed by the match values of the sound signal data signatures at set-up may be tested against as baseline sound signatures.

In some embodiments, in baseline collection mode the GMM classifier is utilized to generate baseline match values for each baseline sound signal data signature. The algorithm then compares each baseline match value to the remainder of the group of baseline match values across multiple baseline sounds, such as two, three, five, or six baseline sounds. In some embodiments, in the case of six baseline sounds, ultimately 52 match values are determined for each user creating a baseline user cluster. The average match value is then calculated as the centroid and the standard deviation is then utilized to calculate an upper and lower threshold for a suitable confidence interval, e.g., a 99.9% confidence interval. In this example, the upper and lower confidence levels are calculated as the average match value plus or minus 3.291, times the standard deviation divided by the square root of 52. The distance from the centroid is also utilized to determine the three sound signal data signatures that are furthest from the centroid. These three sound signal data signatures are then utilized by the GMM classifier as the training references for that user's baseline classification. An example for baseline collection and model generation is provided below.

Example—Baseline Collection

In some embodiments, the signal data signature analysis service 110 may formulate baseline sounds according to a baseline sound algorithm. An example of the baseline sound algorithm employing Python functions is provided below. While Python is described here, any suitable programming language may be performed for analyzing and processing audio files.

In some embodiments, a set of baseline files may be produced from a set of forced cough vocalizations 106 received from the recording device 104. A Python filter may be applied (see, e.g., FIGS. 4A and 4B) and a sound signal data signature detector may be applied. Upon filtering each forced cough vocalization 106 and detecting the associated sound signal data signature by the sound signal data signature detector, each baseline may be output.

For example, where six baselines are used for authentication, a first forced cough vocalization 106 may be filtered and a first sound signal data signature may be detected. The first sound signal data signature may be recorded as a first baseline ("baseline #1). A second forced cough vocalization 106 may be filtered and a second sound signal data signature may be detected. The second sound signal data signature may be recorded as a second baseline ("baseline #2). A third forced cough vocalization 106 may be filtered and a third sound signal data signature may be detected. The third sound signal data signature may be recorded as a third baseline ("baseline #3). A fourth forced cough vocalization 106 may be filtered and a fourth sound signal data signature may be detected. The fourth sound signal data signature may be recorded as a fourth baseline ("baseline #4). A fifth forced cough vocalization 106 may be filtered and a fifth sound signal data signature may be detected. The fifth sound signal data signature may be recorded as a fifth baseline ("baseline #5). A sixth forced cough vocalization 106 may be filtered and a sixth sound signal data signature may be detected. The sixth sound signal data signature may be recorded as a first baseline ("baseline #6).

Multiple models may be formed from various combinations of each baseline in the set of baselines such that each combination include a non-repeating set of baselines, and each combination of the various combinations is unique relative to the other combinations of the various combinations. In some embodiments, the combinations may include all possible combinations, or a sample of the possible combinations (e.g., randomly selected sample, predetermined sample, user selected sample, or other sampling methodology or any combination thereof), where each combination includes two or more of the baselines. Each combination may include one or more baselines to be used as a baseline and one or more baselines to be used as a match file in order to train and/or test a model against known baselines. For example, for six baselines, all combinations including a selection of 3 of the baselines to be used as model baselines and 1 of the baselines to be used as a test match file, there are twenty total combinations. A model, such as a Gaussian mixture model (as described above) may be formed for each combination, e.g., 60 models.

Each Gaussian mixture model may be run to compare each respective test match file to each respective three model baselines. Each Gaussian mixture model may output a match value as a result which quantifies a degree of match between the test match file and the three model baselines. The match values may be recorded, e.g., in a matrix having rows representing each Gaussian mixture model, including the respective model baselines and the respective match file of each Gaussian mixture model of each row. An example matrix is represented below in Table 1:

TABLE 1

Match value Matrix

| GMM Baseline A | GMM Baseline B | GMM Baseline C | Match file | Match Value for Match file | Distance to Match Value Average |
|---|---|---|---|---|---|
| Baseline 1 | Baseline 2 | Baseline 3 | Baseline 4 | | |
| Baseline 1 | Baseline 2 | Baseline 3 | Baseline 5 | | |
| Baseline 1 | Baseline 2 | Baseline 3 | Baseline 6 | | |
| Baseline 1 | Baseline 2 | Baseline 4 | Baseline 3 | | |
| Baseline 1 | Baseline 2 | Baseline 4 | Baseline 5 | | |
| Baseline 1 | Baseline 2 | Baseline 4 | Baseline 6 | | |
| Baseline 1 | Baseline 2 | Baseline 5 | Baseline 3 | | |
| Baseline 1 | Baseline 2 | Baseline 5 | Baseline 4 | | |
| Baseline 1 | Baseline 2 | Baseline 5 | Baseline 6 | | |
| Baseline 1 | Baseline 2 | Baseline 6 | Baseline 3 | | |
| Baseline 1 | Baseline 2 | Baseline 6 | Baseline 4 | | |
| Baseline 1 | Baseline 2 | Baseline 6 | Baseline 5 | | |
| Baseline 1 | Baseline 3 | Baseline 4 | Baseline 2 | | |
| Baseline 1 | Baseline 3 | Baseline 4 | Baseline 5 | | |
| Baseline 1 | Baseline 3 | Baseline 4 | Baseline 6 | | |
| Baseline 1 | Baseline 3 | Baseline 5 | Baseline 2 | | |
| Baseline 1 | Baseline 3 | Baseline 5 | Baseline 4 | | |
| Baseline 1 | Baseline 3 | Baseline 5 | Baseline 6 | | |
| Baseline 1 | Baseline 3 | Baseline 6 | Baseline 2 | | |
| Baseline 1 | Baseline 3 | Baseline 6 | Baseline 4 | | |
| Baseline 1 | Baseline 3 | Baseline 6 | Baseline 5 | | |
| Baseline 1 | Baseline 4 | Baseline 5 | Baseline 2 | | |
| Baseline 1 | Baseline 4 | Baseline 5 | Baseline 3 | | |
| Baseline 1 | Baseline 4 | Baseline 5 | Baseline 6 | | |
| Baseline 1 | Baseline 4 | Baseline 6 | Baseline 2 | | |

TABLE 1-continued

Match value Matrix

| GMM Baseline A | GMM Baseline B | GMM Baseline C | Match file | Match Value for Match file | Distance to Match Value Average |
|---|---|---|---|---|---|
| Baseline 1 | Baseline 4 | Baseline 6 | Baseline 3 | | |
| Baseline 1 | Baseline 4 | Baseline 6 | Baseline 5 | | |
| Baseline 1 | Baseline 5 | Baseline 6 | Baseline 2 | | |
| Baseline 1 | Baseline 5 | Baseline 6 | Baseline 3 | | |
| Baseline 1 | Baseline 5 | Baseline 6 | Baseline 4 | | |
| Baseline 2 | Baseline 3 | Baseline 4 | Baseline 1 | | |
| Baseline 2 | Baseline 3 | Baseline 4 | Baseline 5 | | |
| Baseline 2 | Baseline 3 | Baseline 4 | Baseline 6 | | |
| Baseline 2 | Baseline 3 | Baseline 5 | Baseline 1 | | |
| Baseline 2 | Baseline 3 | Baseline 5 | Baseline 4 | | |
| Baseline 2 | Baseline 3 | Baseline 5 | Baseline 6 | | |
| Baseline 2 | Baseline 3 | Baseline 6 | Baseline 1 | | |
| Baseline 2 | Baseline 3 | Baseline 6 | Baseline 4 | | |
| Baseline 2 | Baseline 3 | Baseline 6 | Baseline 5 | | |
| Baseline 2 | Baseline 4 | Baseline 5 | Baseline 1 | | |
| Baseline 2 | Baseline 4 | Baseline 5 | Baseline 3 | | |
| Baseline 2 | Baseline 4 | Baseline 5 | Baseline 6 | | |
| Baseline 2 | Baseline 4 | Baseline 6 | Baseline 1 | | |
| Baseline 2 | Baseline 4 | Baseline 6 | Baseline 3 | | |
| Baseline 2 | Baseline 4 | Baseline 6 | Baseline 5 | | |
| Baseline 2 | Baseline 5 | Baseline 6 | Baseline 1 | | |
| Baseline 2 | Baseline 5 | Baseline 6 | Baseline 3 | | |
| Baseline 2 | Baseline 5 | Baseline 6 | Baseline 4 | | |
| Baseline 3 | Baseline 4 | Baseline 5 | Baseline 1 | | |
| Baseline 3 | Baseline 4 | Baseline 5 | Baseline 2 | | |
| Baseline 3 | Baseline 4 | Baseline 5 | Baseline 6 | | |
| Baseline 3 | Baseline 4 | Baseline 6 | Baseline 1 | | |
| Baseline 3 | Baseline 4 | Baseline 6 | Baseline 2 | | |
| Baseline 3 | Baseline 4 | Baseline 6 | Baseline 5 | | |
| Baseline 3 | Baseline 5 | Baseline 6 | Baseline 1 | | |
| Baseline 3 | Baseline 5 | Baseline 6 | Baseline 2 | | |
| Baseline 3 | Baseline 5 | Baseline 6 | Baseline 4 | | |
| Baseline 4 | Baseline 5 | Baseline 6 | Baseline 1 | | |
| Baseline 4 | Baseline 5 | Baseline 6 | Baseline 2 | | |
| Baseline 4 | Baseline 5 | Baseline 6 | Baseline 3 | | |

As shown in Table 1 above, the match value may be calculated by each Gaussian mixture model. Additionally, statistical values including an average of the match values may be determined in order to determine a statistical score such as a distance from an average match value for each match file. The distance may be a difference between the match value and an average match value, a Euclidean distance, a cosine distance, or any other suitable distance measure. In addition to the average match value, other statistical values such as a standard deviation for each model may be determined where n is the number of match values, which, in this example, is 60.

A confidence value of each match file ("sdconfidencelevel") can be computed as $-1*sd\_value*Average$ Match value.

Where the standard deviation is greater than sdconfidencelevel, then the match file with the greatest distance may be removed from the matrix and saved as an error file. A notification or prompt may be provided to the user to request submission of a replacement sound signal data signature for the baseline of the removed match file.

Outlier confidence interval bounds may be computed based on the average match value and the standard deviation. For example, the outlier confidence interval bounds may include an upper outlier confidence interval bound (UCLo) and a lower outlier confidence interval bound (LCLo) as per equation 1 and equation 2, respectively, below:

$$UCLo = (\text{Average } Matchvalue) + \left(zb_{value} * \left(\frac{Std.Dev.}{sqrt(n)}\right)\right) \quad \text{Equation 1}$$

$$LCLo = (\text{Average } Matchvalue) - \left(zb_{value} * \left(\frac{Std.Dev.}{sqrt(n)}\right)\right) \quad \text{Equation 2}$$

where n is the number of match values (e.g., 60 as per Table 1 above), and zb_value is a configurable constant.

Each match file can be assessed as to whether the match file is an outlier based on the UCLo and the LCLo. Where a particular match file is above the UCLo or below the LCLo, then the baseline associated with particular match file may be removed, saved as an error file, and a notification or prompt may be provided to the user to request submission of a replacement sound signal data signature for the baseline of the removed match file. The new baseline provided by the user may be recorded to replace the baseline of the removed match file.

A baseline model, e.g., for use by the authentication engine 150, may be formed from the match files as the first set of unique match files in a sequence of the match files (e.g., first 3 unique match files). The sequence may be ordered based on the following characteristics:

a. File with largest match value
b. File with smallest match value
c. File the largest distance from mean
d. File the smallest distance from mean
e. File with second largest match value
f. File with second smallest match value
g. File the second largest distance from mean
h. File the second smallest distance from mean
i. File with third largest match value
j. File with third smallest match value
k. File the third largest distance from mean
l. File the third smallest distance from mean A match file that matches each of the above characteristics may be identified. The characteristics may then be traversed, e.g., in order, until three or more unique match files are identified. For example, a first match file with the largest match value may be identified and selected, a second match file with the smallest match value may then be identified and, if different from the first match file, may also be selected, but if the second match file is the same as the first match file, then the next characteristics is tested and a third match file having the largest distance from the average match value is identified. Similarly, where the third match file is different from the first and second match files, the third match file may also be selected, but if the third match file is the same as either the first or the second match file, then the next characteristic is tested. This process may be performed until the desired number of match files are selected for the baseline model. Other suitable characteristics may be employed and other orders of characteristics may be employed in order to identify the baselines that are most relevant to authenticating forced cough vocalizations.

The model from the selected files may be saved as the user's baseline model for authenticating future records of forced cough vocalizations 106. User-specific upper and lower match confidence interval bounds (UCLm and LCLm, respectively) may be calculated using, e.g., equations 3 and 4, respectively below:

$$UCLo = (\text{Average } Matchvalue) + \left(z_{value} * zut_{shift} * \left(\frac{Std.Dev.}{sqrt(n)}\right)\right) \quad \text{Equation 3}$$

$$LCL_o = (\text{Average } Matchvalue) - \left(z_{value} * zlt_{shift} * \left(\frac{Std.Dev.}{sqrt(n)}\right)\right) \quad \text{Equation 4}$$

where n is the number of match values (e.g., 60 as per Table 1 above), and z value, zut_shift and zlt_shift are configurable constants. The UCLm and the LCLm may be saved as the upper and lower match thresholds for the baseline model specific to the user.

The baseline model may then be used to test a new match file based on a new forced cough vocalization 106. The new match file may be compared to the selected baselines as a Gaussian mixture model. Where the match value produced by the baseline model is between (e.g., inclusive of or exclusive of) the UCLm and the LCLm, the new match file is deemed a match to the baseline model and thus authenticated. Where the match value is greater than (or equal to) the UCLm and/or less than (or equal to) the LCLm, then the new match file is not a matched and thus non-authenticated.

Access Control Based on the Authentication Engine 150

In some embodiments, an access control software application may include four components. In some embodiments, the first component is a software application for handheld devices that allows for the scanning of the QR code 108 from the mobile software application on the user computing device 102. In some embodiments, the second component is an access control API, e.g., to the access control server 3 described above configured to implement the access control software application. In some embodiments, access control software application decodes the QR code 108 (or any other suitable encoding) and returns the photo and name for the user attempting authentication to the handheld device running the perimeter app. In some embodiments, the perimeter application displays the image and name, allowing the gate keeper to validate the authentication. The validation is then passed back to the access control API which records this in the premises operator database. In some embodiments, the API may include, e.g., data such as a client ID, a key-value, a job ID, a job key, etc. In some embodiments, the client ID and the key-value are received via the QR code 108 and are used to identify and access user data for verification, such as the photo and name of the user. In some embodiments, using the data, an API call may be made, e.g., according to the following format:

```
{
    "ClientID": 1133925,
    "clientkey": "",
    "jobid": "5100016120",
    "jobkey": ""
}
```

In some embodiments, in response to the API call, the access control server 3 may return data via a response API call, e.g., according to the following format:

```
{
    "result": "success",
    "message": "baseline ,
    "accessid": 9000000241,
    "matchtime": "2021-02-,
    "matchageminutes": 824,
```

```
    "imgurl": "https://",
    "firstname": "Morgan",
    "lastname": "Cox"
}
```

In some embodiments, the premises operator may then verify the user based on the result and a match of the user to the photo returned by the access control server 3. As a result, in response to the verification or non-verification, the perimeter app may send to the access control server 3, e.g., via the API, validation data, e.g., according to the following format:

```
{
    "clientid": 1133925,
    "clientkey": "",
    "accessid": 9000000241,
    "validateresult": "match"
}
```

In some embodiments, the third component is the premises operator dashboard, an online application that allows premises owners to see real time as well as historical authentications, non-authentications, lists of those admitted, perimeter devices in use, and their locations, and other pertinent information. The premise operator's dashboard also allows the user to generate reports. In some embodiments, the access control server 3 may log authentication and validation attempts and the results and attributes thereof. The premises operator may view the log via the premises operator dashboard, which is configured to access the access control server 3 and visualize the log.

FIG. 4A depicts an illustrative computer-based system for sound signal data signature analysis including a user computing device configured to record sound signal data signatures of a user according to embodiments of the present disclosure. FIG. 4B depicts an example of signal data source pre-processing filters "Audio Filters" which implement audio digital signal processing techniques with the purpose of standardizing the overall quality of the signal data source according to embodiments of the present disclosure.

FIG. 5 depicts an illustrative AI sound signal data signature analysis model engine of the sound signal data signature analysis service for sound signal data signature analysis according to embodiments of the present disclosure.

FIG. 6 depicts an illustrative AI sound signal data signature identification model engine of the sound signal data signature analysis service for sound signal data signature analysis according to embodiments of the present disclosure.

Figure 7:
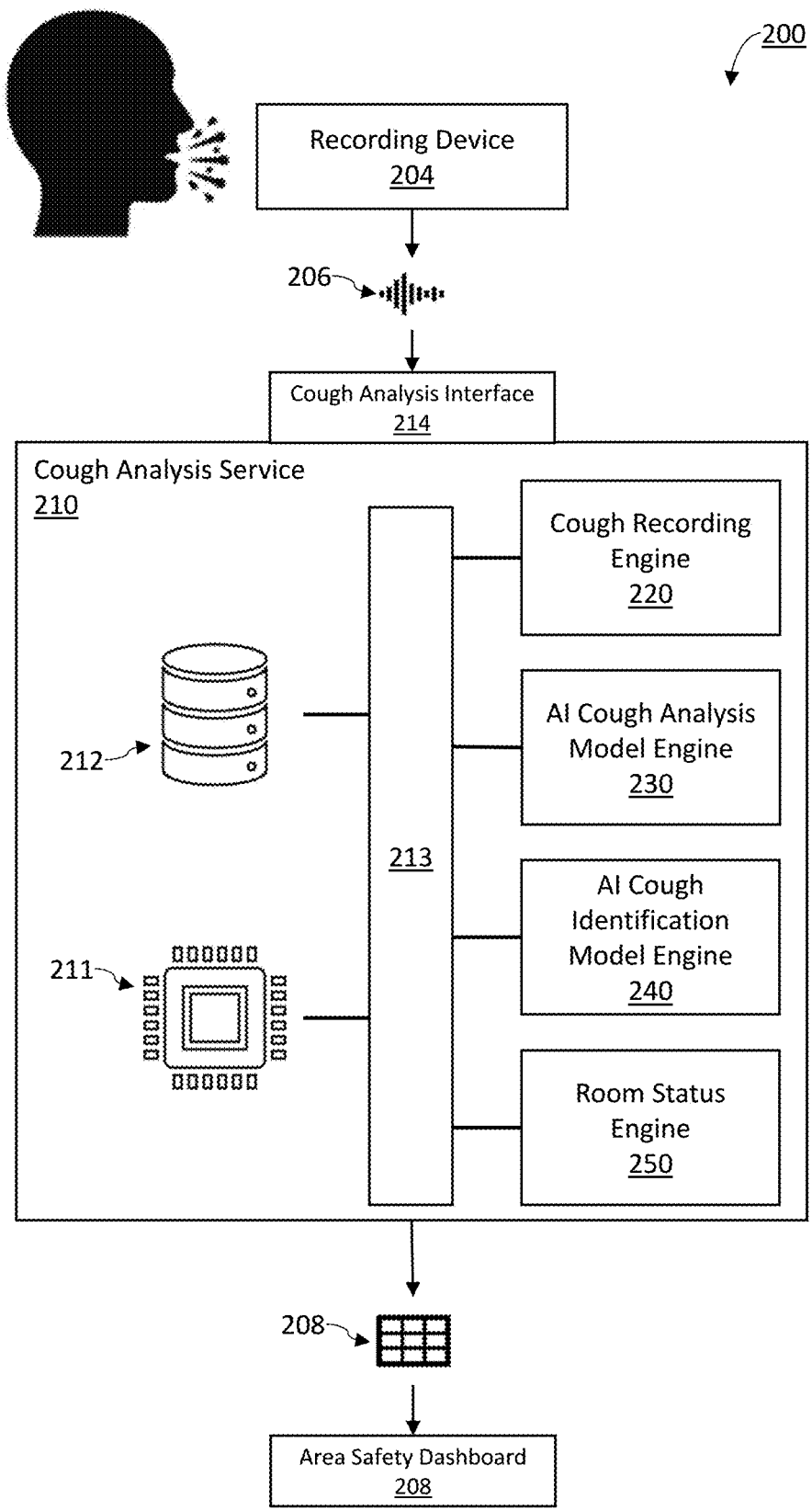
FIG. 7 depicts an illustrative computer-based system for sound signal data signature analysis including a sound signal data signature analysis service that receives sound signal data signatures from a fixed position recording device according to embodiments of the present disclosure.

FIG. 7 depicts an illustrative computer-based system for sound signal data signature analysis including a sound signal data signature analysis service that receives sound signal data signatures from a fixed position recording device according to embodiments of the present disclosure.

In some embodiments, a user may record a sound signal data signature using a recording device 204. For example, the recording device 204 may include one or more microphones and a software application configured to use the microphones for recording sounds. In some embodiments, the sound signal data signature may include any ambiently monitored detection of a sound signal data signature, such as a forced sound signal data signature vocalization or an involuntary sound signal data signature or both. As described above, a sound signal data signature is unique to each individual. Thus, the sound signal data signature may also be used to assess changes to the user's sound signal data signature by, e.g., comparing the sound signal data signature to a baseline signature.

In some embodiments, the sound signal data signature analysis service 210 may be configured to receive the sound signal data signature 206 and compare a signature thereof to a baseline signature in order to identify anomalous sound signal data signatures may provide more efficient early warning and screening for any anomaly inducing factor, improving the speed, efficiency, cost and access to quickly recognizing and mitigating the anomaly inducing factor.

Accordingly, in some embodiments, the user recording device 204 may provide the sound signal data signature 206 to the sound signal data signature analysis service 210, e.g., via a sound signal data signature analysis interface 214. In some embodiments, the sound signal data signature analysis interface 214 may include any suitable interface for data communication as described above, including any suitable communication protocol as described above.

In some embodiments, the recording device 204 may ambiently monitor the sounds of an area, such as a room, a hallway, a theater, etc. However, the recording device 204 may not have the processing resources to automatically identify sound signal data signatures as opposed to other sounds in the area. Thus, the recording device 204 may automatically upload detected sounds of any type as sound signal data signatures 206 for automatic analysis and sound signal data signature recording by the sound signal data signature analysis service 210. For example, the recording device 204 may provide samples of noises recorded, segments of recordings where noise amplitudes exceeded a threshold floor including a suitable time frame around the noise amplitudes, or other portions of recordings.

In some embodiments, the sound signal data signature analysis service 210 may receive the sound signal data signature 206 and analyze the sound signal data signature 206 to determine a sound signal data signature recording of the sound signal data signature isolated from noise and artifacts of in the recorded sound signal data signature 206, generate a signature for the sound signal data signature recording, and compare the signature to a baseline signature. In some embodiments, the sound signal data signature analysis service 210 may be a part of a user computing device or other computing device. Thus, the sound signal data signature analysis service 210 may include hardware and software components including, e.g., user computing device 202 hardware and software, cloud or server hardware and software, or a combination thereof, including the hardware and/or software as described above.

In some embodiments, to determine a sound signal data signature recording of the sound signal data signature isolated from noise and artifacts of in the recorded sound signal data signature 206, the sound signal data signature analysis service 210 may include computer engines including, e.g., the sound signal data signature recording engine 220. In some embodiments, the sound signal data signature recording engine 220 may include dedicated and/or shared software components, hardware components, or a combination thereof. For example, the sound signal data signature recording engine 220 may include a dedicated processor and storage. However, in some embodiments, the sound signal data signature recording engine may share hardware resources, including the processor 211 and storage 212 of the sound signal data signature analysis service 210 via, e.g., a bus 213.

In some embodiments, to leverage machine learning models generate a signature for the sound signal data signature recording, the sound signal data signature analysis service 210 may include computer engines including, e.g., the AI sound signal data signature analysis model engine 230. In some embodiments, the AI sound signal data signature analysis model engine 230 may include dedicated and/or shared software components, hardware components, or a combination thereof. For example, the AI sound signal data signature analysis model engine 230 may include a dedicated processor and storage. However, in some embodiments, the AI sound signal data signature analysis model engine 230 may share hardware resources, including the processor 211 and storage 212 of the sound signal data signature analysis service 210 via, e.g., a bus 213.

In some embodiments, to leverage machine learning models compare the signature to a baseline signature to identify potentially anomalous sound signal data signatures, the sound signal data signature analysis service 210 may include computer engines including, e.g., the AI sound signal data signature identification model engine 240. In some embodiments, the AI sound signal data signature identification model engine 240 may include dedicated and/or shared software components, hardware components, or a combination thereof. For example, the AI sound signal data signature identification model engine 240 may include a dedicated processor and storage. However, in some embodiments, the AI sound signal data signature identification model engine 240 may share hardware resources, including the processor 211 and storage 212 of the sound signal data signature analysis service 210 via, e.g., a bus 213.

In some embodiments, to update and/or log a room status according to the present of a potential respiratory anomaly inducing factor, the sound signal data signature analysis service 210 may include computer engines including, e.g., the room status engine 250. In some embodiments, the room status engine 250 may include dedicated and/or shared software components, hardware components, or a combination thereof. For example, the room status engine 250 may include a dedicated processor and storage. However, in some embodiments, the room status engine 250 may share hardware resources, including the processor 211 and storage 212 of the sound signal data signature analysis service 210 via, e.g., a bus 213.

In some embodiments, the sound signal data signature analysis service 210 may be customized for area-based sound signal data signature monitoring to compliment the sound signal data signature analysis service 110 and access control described above. In some embodiments, the area-based sound signal data signature monitoring may be a stand-alone solution separate from access control or may be combined with access control to improve the safety of an area.

Area-Based Sound Signal Data Signature Monitoring

In some embodiments, the area-based sound signal data signature monitoring system 200 may include six components. In some embodiments, the first component may include the recording device 204 including an active microphone area sensor that detects and records sounds. In some embodiments, the sound signal data signature recording engine 220 may receive a recording of the sounds from the recording device 204. In some embodiments, the sound signal data signature recording engine 220 may filter the recording, e.g., with filters, and converts the filtered sound to a sound signal data signature file, such as, e.g., an encrypted, non-audio spectral image of the sound signal data that is sent from the monitored location to the sound signal data signature analysis servers implementing the sound signal data signature analysis service 210. In some embodiments, the sound signal data signature is next analyzed by the AI sound signal data signature analysis model engine 230. In some embodiments, similar to the AI sound signal data signature analysis model engine 130 described above, the AI sound signal data signature analysis model engine 230 may include an HMM sound detector, which sorts and directs the sound to the AI sound signal data signature identification model engine 240. In some embodiments, the AI sound signal data signature identification model engine 240 may include a GMM classifier or any other suitable unsupervised classifier model or any combination thereof.

In some embodiments, when a match file is received, the GMM classifier compares the match file to the baselines reporting a match value for the match file. This is compared to the upper and lower thresholds for the user, determining the probability that the match file belongs to the same match value cluster as the area baseline. In some embodiments, the GMM classifier attempts to authenticate or not or the area as unchanged, based on an upper threshold calculated as according to Equation 3 above, and a lower threshold calculated according to Equation 4 above.

In some embodiments, the overall design of the area-based sound signal data signature monitoring system 200 is to provide a deterministic "Glass-Break" algorithm with probabilities that are converted to a binary "Glass-Break" versus "Area Stable". In some embodiments, the GMM classifier compares the matching file to area baseline authenticate the area as "stable" versus non-authentication. If the area is determined to be unchanged from baseline, it is reported by the algorithm of the area status engine 250 as "Area Stable, no significant change." If the area is determined to have changed from the baseline, then a weighted probability of change is sent to the "Glass-Break" algorithm. If the area is determined to have been changed, then the algorithm of the area status engine 250 also checks the classifier outputs.

If the GMM classifier reports, "not stable", then the "Glass-Break algorithm" of the area status engine 250 reports the "Area is Stable, No Significant Change". In some embodiments, the area status engine 250 may then output an area safety dashboard 208 including the determine of "Stable" or "Glass break", or any other suitable indicia, to an area safety dashboard 208 for notification, alert, warning and/or visualization of the area status at any given time. In some embodiments, the sound signal data signature analysis service 210 may continuously or periodically monitor the area and update the area safety dashboard 208 in real-time.

Baseline Collection

In some embodiments, similar to the sound signal data signature analysis service 110 described above, the AI sound signal data signature identification model engine 240 may include the GMM classifier is trained to listen by listening to six baseline sound signal data signatures from the area being monitored. In some embodiments, the baseline match value cluster may be established at setup where the sound signal data signature analysis service 210 collects multiple baseline sound signal data signatures (e.g., two, three, five, six, less than six, more than six or other suitable number) according to the process described above. For example, the sound signal data signature analysis service 210 may collect sound signal data signatures from the user computing device 202, perform audio analysis to isolate and extract the sound signal data signature records using the audio filters of the sound signal data signature recording engine 220, generate sound signal data signatures for each sound signal data signature using the HMM sound detector of the AI sound signal data signature analysis model engine 230, and classify each sound signal data signature by computing match values with the GMM classifier of the AI sound signal data signature identification model engine 240. In some embodiments, the cluster formed by the match values of the sound signal data signatures at set-up may be tested against as baseline sound signatures.

In some embodiments, in baseline collection mode the GMM classifier is utilized to generate baseline match values for each baseline sound signal data signature. The algorithm then compares each baseline match value to the remainder of the group of baseline match values across multiple baseline sounds, such as two, three, five, or six baseline sounds. In some embodiments, in the case of six baseline sounds, ultimately 52 match values are determined for each user creating a baseline user cluster. The average match value is then calculated as the centroid and the standard deviation is then utilized to calculate an upper and lower threshold, e.g., using equations 1 through 4 as described above. In some embodiments, suitable constants may be selected to produce, e.g., a suitable confidence interval, e.g., a 99.9% confidence interval. In this example, the upper and lower confidence levels are calculated as the average match value plus or minus 3.291, times the standard deviation divided by the square root of 52. The distance from the centroid is also utilized to determine the three sound signal data signatures that are furthest from the centroid. These three sound signal data signatures are then utilized by the GMM classifier as the training references for that user's baseline classification.

Area Safety Dashboard 208

In some embodiments, the area safety dashboard 208 may collect, record and visualize area safety dashboard 208 from the sound signal data signature analysis service 210 during monitoring of the area. In some embodiments, the area safety dashboard 208 may aggregate the area safety dashboard 208 on a per-area basis, identifying each status according to, e.g., a name or identifier for each area, an area status for each area, a sound event history for each area, a sound event analysis for each area, sound event alerts when a glass break event is detected, sound event threshold setting for user configurable match value thresholds to determine glass break events, or any external workflows utilizing the sound events, such as contact tracing, health department alerts, user emergency contact alerts, quarantine procedures, etc., among any other data and information or any combination thereof.

Figure 8:
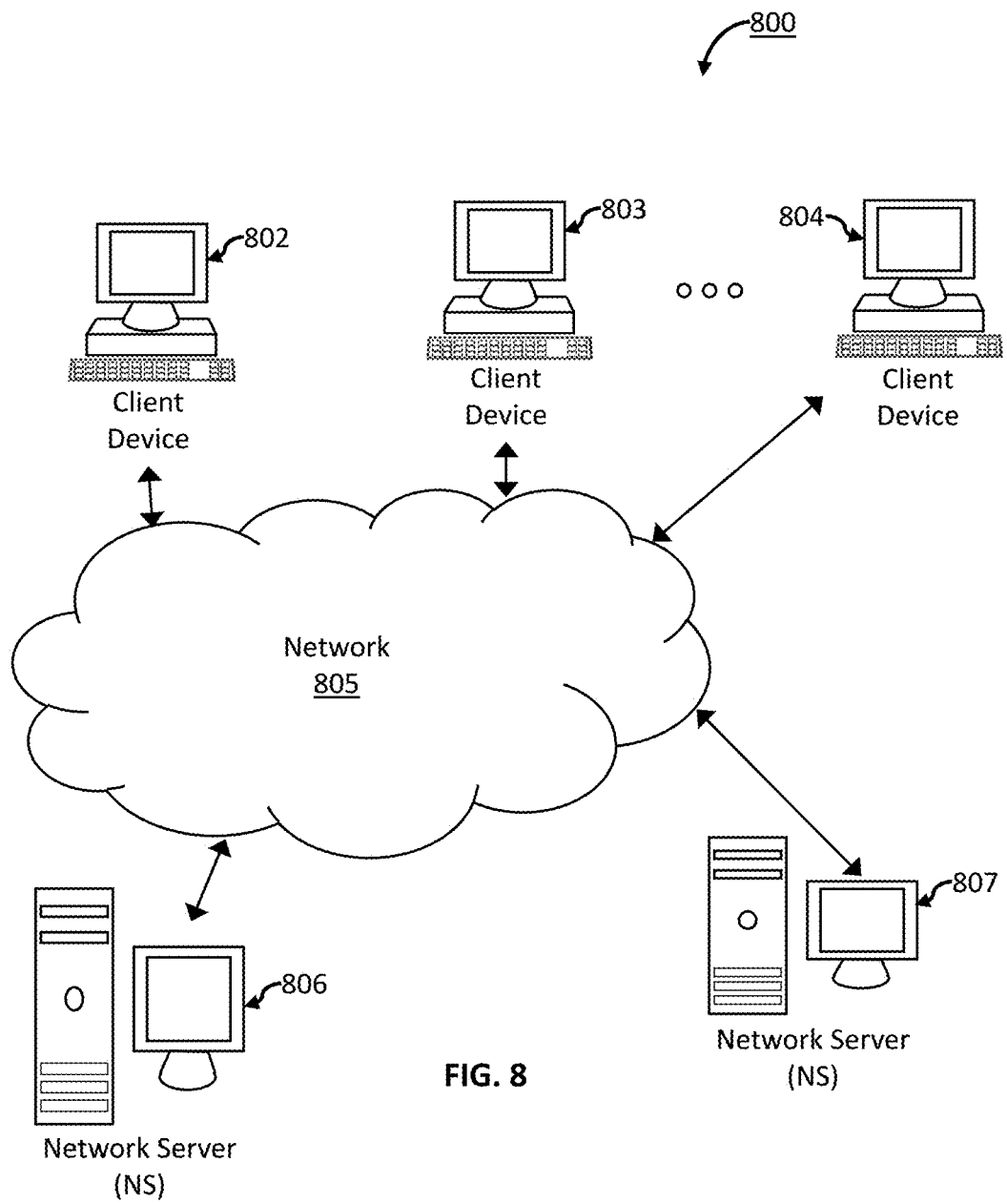
FIG. 8 depicts a block diagram of an exemplary computer-based system and platform 800 in accordance with one or more embodiments of the present disclosure.

FIG. 8 depicts a block diagram of an exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of members and concurrent transactions, as detailed herein. In some embodiments, the exemplary computer-based system and platform 800 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 8, member computing device 802, member computing device 803 through member computing device 804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 802-804 may include may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java, .Net, QT, C, C++ and/or other suitable programming language. In some embodiments, one or more member devices within member devices 802-804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 805 may also include mass storage, such as network attached storage (NAS), a storage area network (SAN), a content delivery network (CDN) or other forms of computer or machine readable media.

In some embodiments, the exemplary server 806 or the exemplary server 807 may be a web server (or a series of servers) running a network operating system, examples of which may include but are not limited to Microsoft Windows Server, Novell NetWare, or Linux. In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 802-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 9:
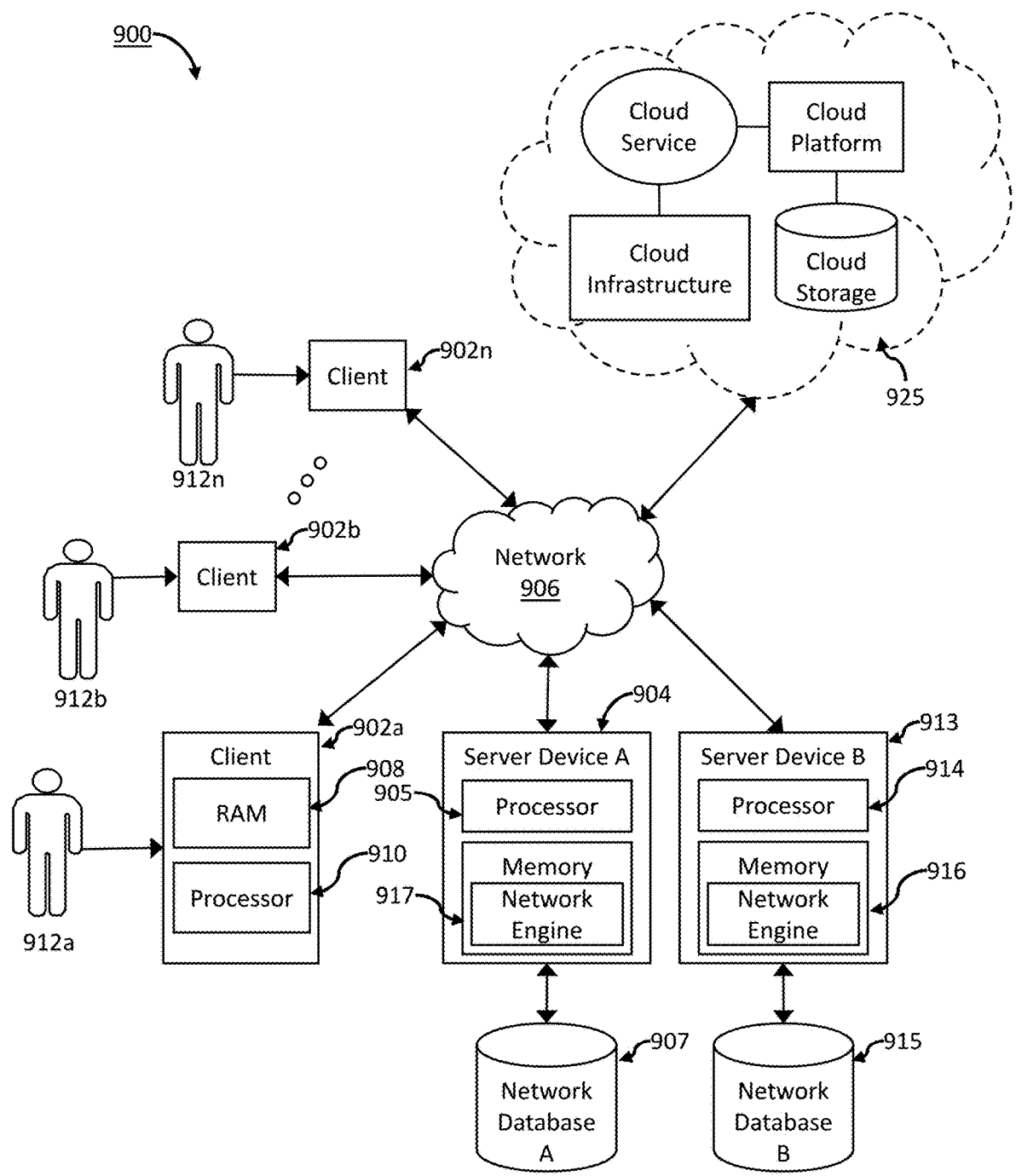
FIG. 9 depicts a block diagram of another exemplary computer-based system and platform 900 in accordance with one or more embodiments of the present disclosure.

FIG. 9 depicts a block diagram of another exemplary computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 902a, member computing device 902b through member computing device 902n shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client 902a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 902a through 902n may also comprise a number of external or internal devices such as a mouse, a CD-ROM, DVD, a physical or virtual keyboard, a display, or other input or output devices. In some embodiments, examples of member computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902a through 902n may be specifically programmed with one or more application programs in accordance with one or more principles/methodologies detailed herein. In some embodiments, member computing devices 902a through 902n may operate on any operating system capable of supporting a browser or browser-enabled application, such as Microsoft™ Windows™, and/or Linux. In some embodiments, member computing devices 902a through 902n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 902a through 902n, user 912a, user 912b through user 912n, may communicate over the exemplary network 906 with each other and/or with other systems and/or devices coupled to the network 906. As shown in FIG. 9, exemplary server devices 904 and 913 may include processor 905 and processor 914, respectively, as well as memory 917 and memory 916, respectively. In some embodiments, the server devices 904 and 913 may be also coupled to the network 906. In some embodiments, one or more member computing devices 902a through 902n may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
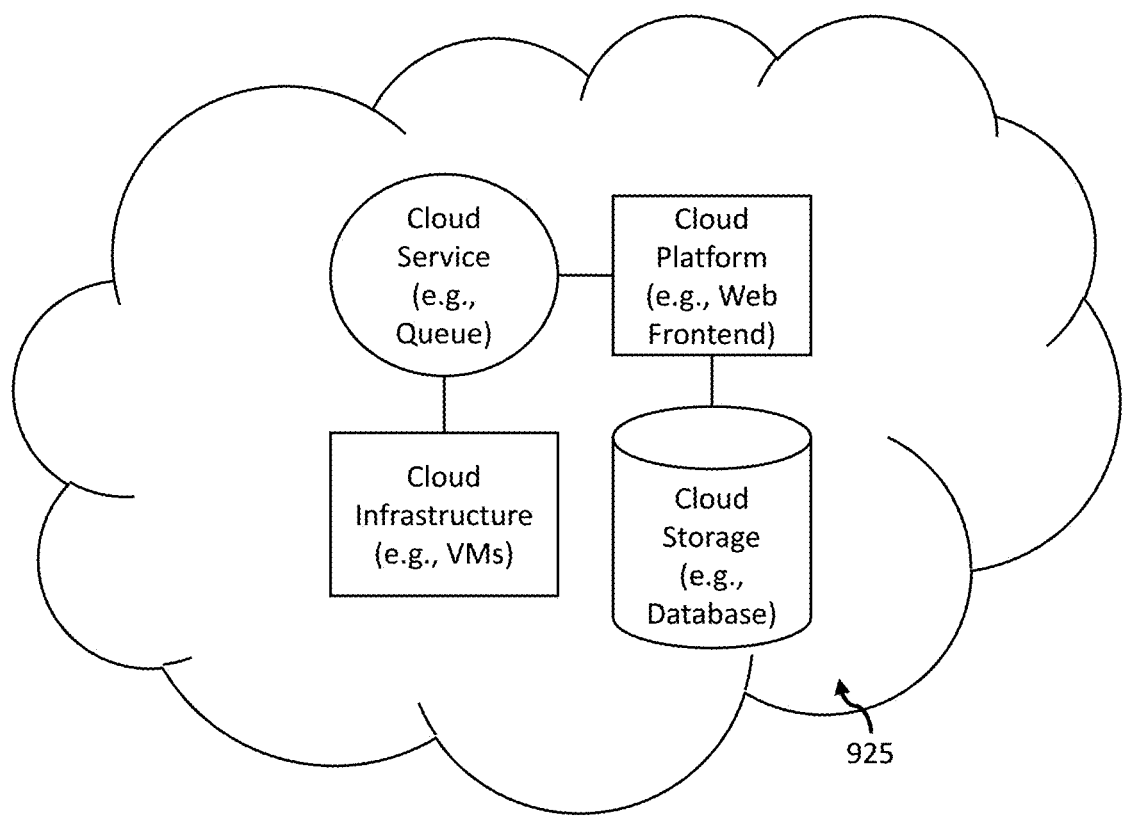
FIG. 10 illustrates schematics of an exemplary implementation of the cloud computing/architecture(s) in which the computer-based systems of the present disclosure may be specifically configured to operate.
Figure 11:
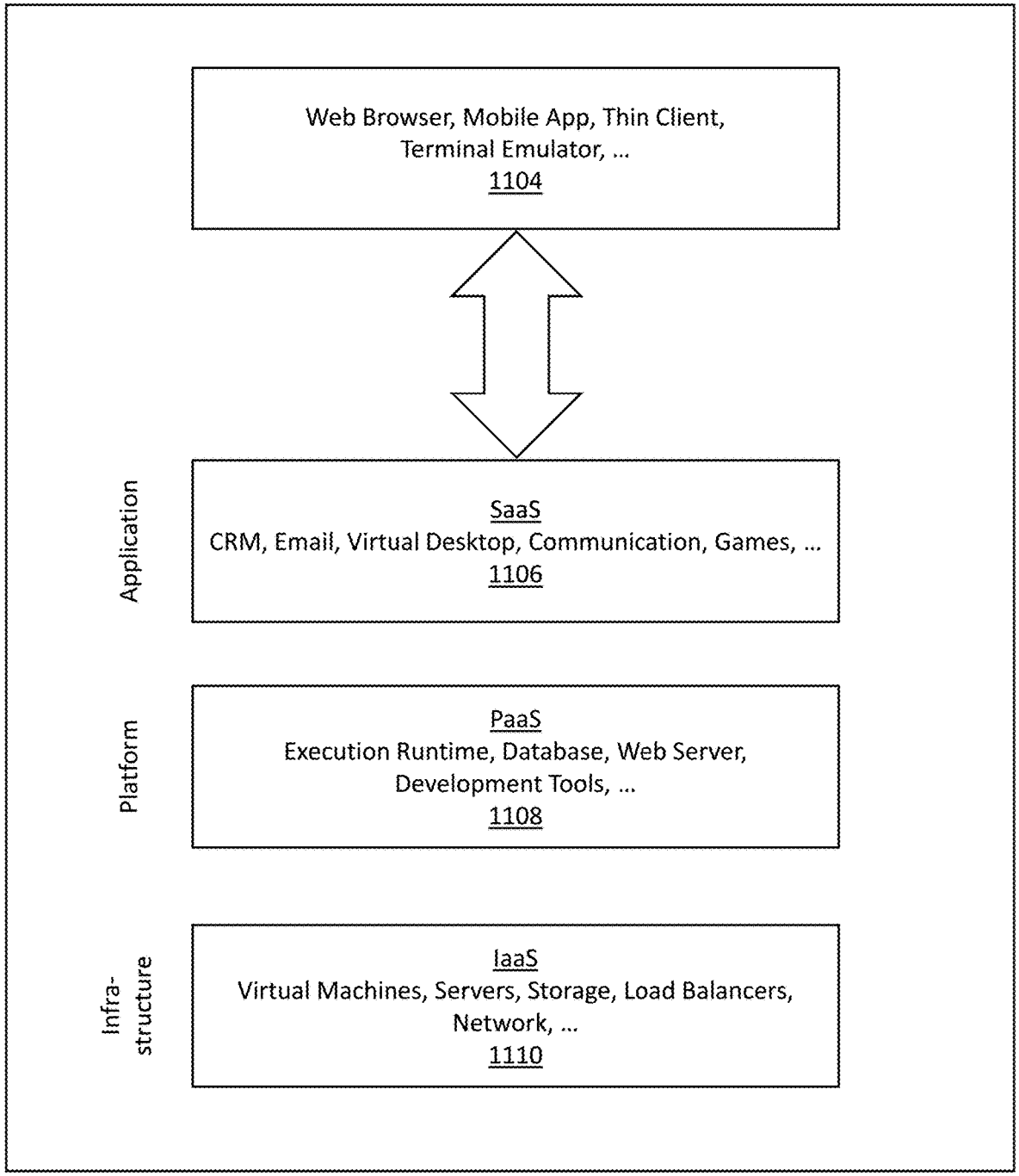
FIG. 11 illustrates schematics of another exemplary implementation of the cloud computing/architecture(s) in which the computer-based systems of the present disclosure may be specifically configured to operate.

In some embodiments, the exemplary inventive computer-based systems/platforms, the exemplary inventive computer-based devices, and/or the exemplary inventive computer-based components of the present disclosure may be specifically configured to operate in a cloud computing/architecture 925 such as, but not limiting to: infrastructure a service (IaaS) 1110, platform as a service (PaaS) 1108, and/or software as a service (SaaS) 1106 using a web browser, mobile app, thin client, terminal emulator or other endpoint 1104. FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

FIGS. 12 through 22 depict a flow and associated screenshots for user registration of a baseline sound signal data signature.

Figure 12:
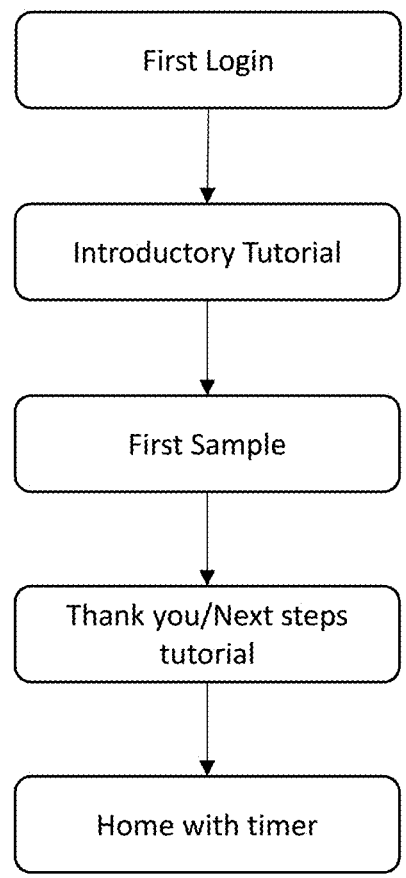
FIG. 12 depicts a flow for user registration of a baseline sound signal data signature according to aspects of embodiments of the present disclosure.
Figure 13A:
FIG. 13A-13D depict illustrative login screens to the sound signal data signature analysis platform according to aspects of embodiments of the present disclosure.
Figure 13B:
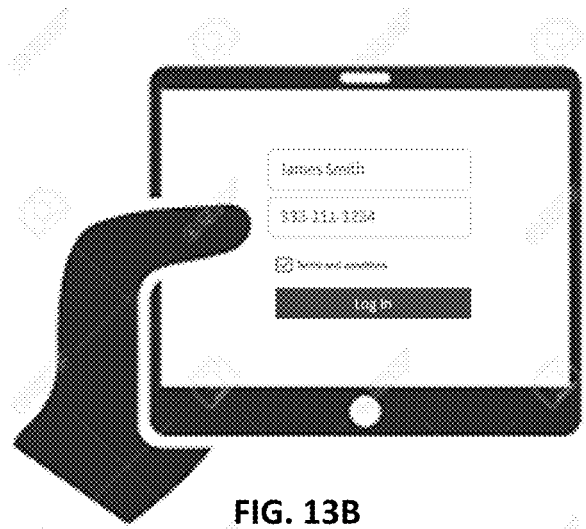
Figure 13C:
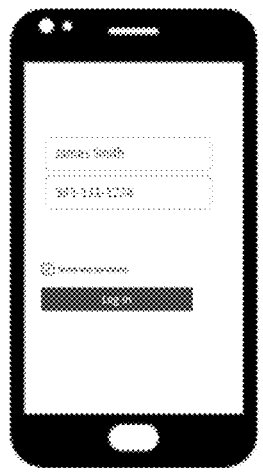
Figure 13D:
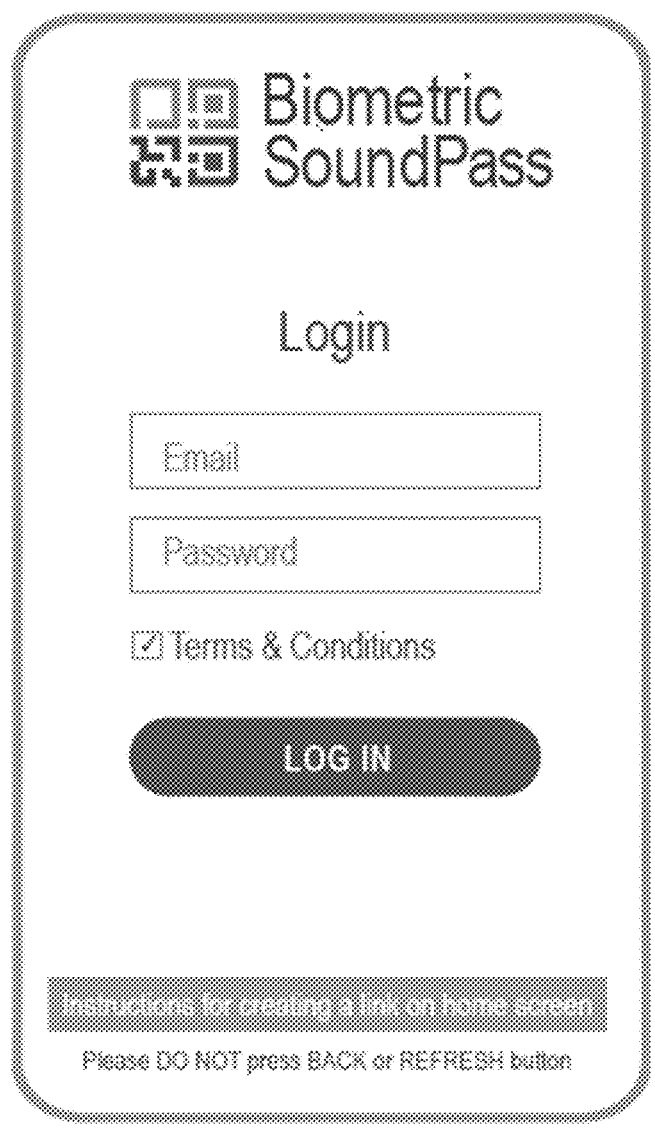

Referring to FIG. 12, a user may initiate a first login with a user computing device to log into an application for the sound signal data signature analysis system. In some embodiments, the user may enter account credentials, such as a username or email and password. In some embodiments, the first login may include an introductory tutorial that includes an explainer tutorial to explain the goal of the sound signal data signature analysis system and what is needed to establish a baseline.

In some embodiments, the application may transition from the introductory tutorial to a first sample collection. In some embodiments, the first sample collection may include an interface with a user selectable element to select to record. Upon selection of the record element, the user may force a sound signal data signature to record a first sample sound signal data signature. In some embodiments, if there is an error collecting the sample, there would be a simple "error, please try again" note on the same record page.

In some embodiments, the application may transition from first sample interface to a Thank/next steps tutorial. In some embodiments, once the sample has been accepted, the user may receive a "next steps" mini-tutorial explaining two additional baseline steps (e.g., the need to repeat this sample submission process two more times to train the application).

In some embodiments, upon completion of the Thank/ next steps tutorial, the application may transition to a home page having a timer. The timer may include a countdown, the end of which may trigger a next recording for another sample.

FIG. 13A through 13D depict illustrative login screens to the sound signal data signature analysis platform according to aspects of embodiments of the present disclosure.

Figure 14:
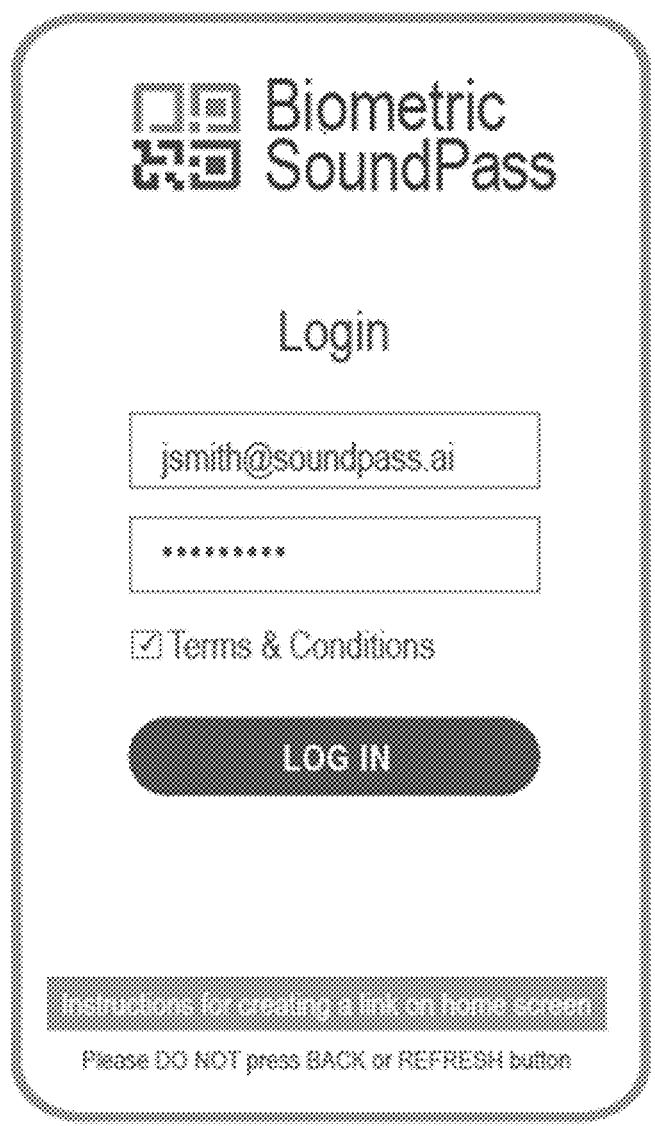
FIG. 14 depicts another illustrative login screen to the sound signal data signature analysis platform with user login credentials entered according to aspects of embodiments of the present disclosure.

FIG. 14 depicts another illustrative login screen to the sound signal data signature analysis platform with user login credentials entered according to aspects of embodiments of the present disclosure. In some embodiments, the login credentials may include a user ID such as, e.g., an email address, avatar or alias, telephone number, etc. The login credentials may also include a password and/or two-factor authentication and/or personal identification number (PIN).

Figure 15:
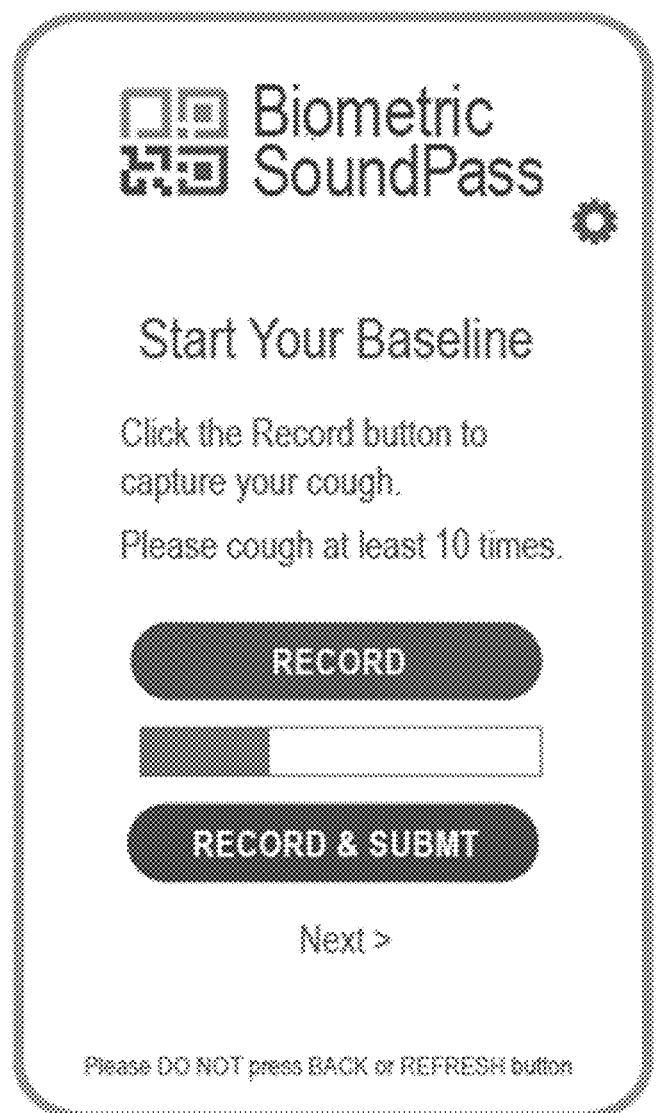
FIG. 15 depicts an illustrative sound signal data signature recording submission interface according to aspects of embodiments of the present disclosure.

FIG. 15 depicts an illustrative sound signal data signature recording submission interface according to aspects of embodiments of the present disclosure. In some embodiments, the sound signal data signature recording submission interface presents an option to record sound signal data signatures to generate a baseline signature upon user selection. In some embodiments, the recording of the baseline may include a suitable number of sound signal data signatures, such as, e.g., three, four, five or six sound signal data signature recordings. In some embodiments, the sound signal data signature recordings may be recorded within a suitable period, such as, e.g., three hours, four hours, six hours, between eight and twelve hours, between twelve and eighteen hours, between twelve and twenty-four hours, etc. In some embodiments, to initiate the recording the user may select a "record" button and force a sound signal data signature at a suitable distance from the device, such as, e.g., about six to twelve inches, six to eighteen inches, or other suitable distance.

Figure 16:
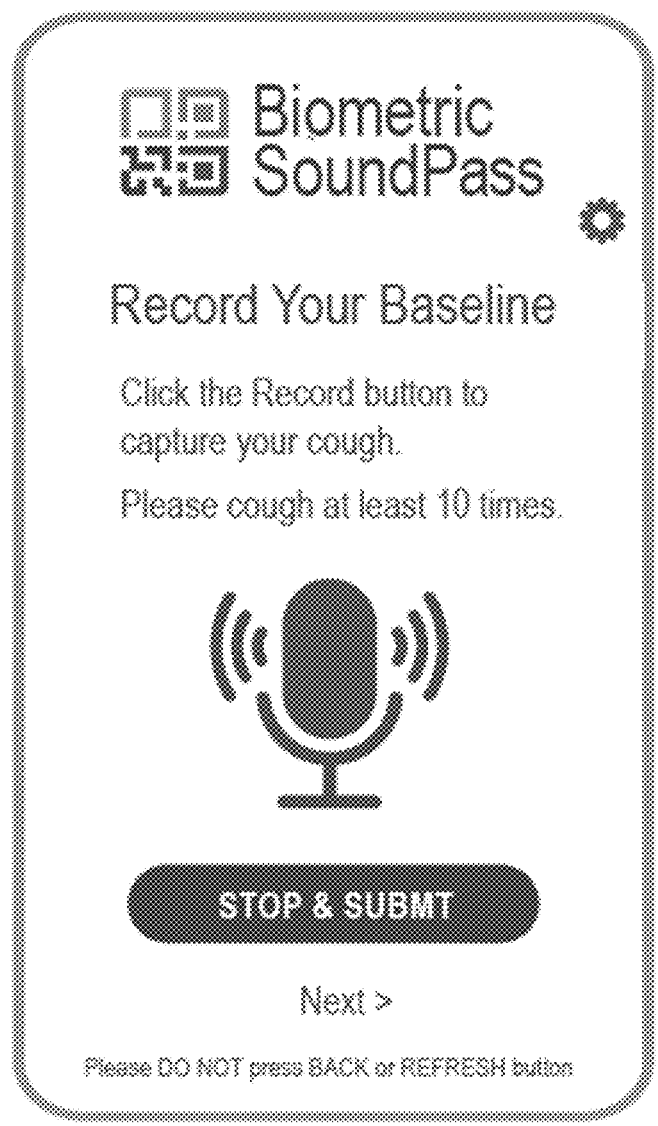
FIG. 16 depicts an illustrative sound signal data signature recording interface with user instruction according to aspects of embodiments of the present disclosure.

FIG. 16 depicts an illustrative sound signal data signature recording interface with user instruction according to aspects of embodiments of the present disclosure. In some embodiments, upon clicking the "record" button, an animation may play that indicates that the device is recording, such as a pulsing microphone image, an illuminated microphone image, a text-based indication of recording, a presentation of an icon (e.g., a microphone icon), or other animation or graphical indication. In some embodiments, upon completing the forced sound signal data signature, the user may select a "stop and submit" button to stop recording and automatically submit the forced sound signal data signature.

Figure 17:
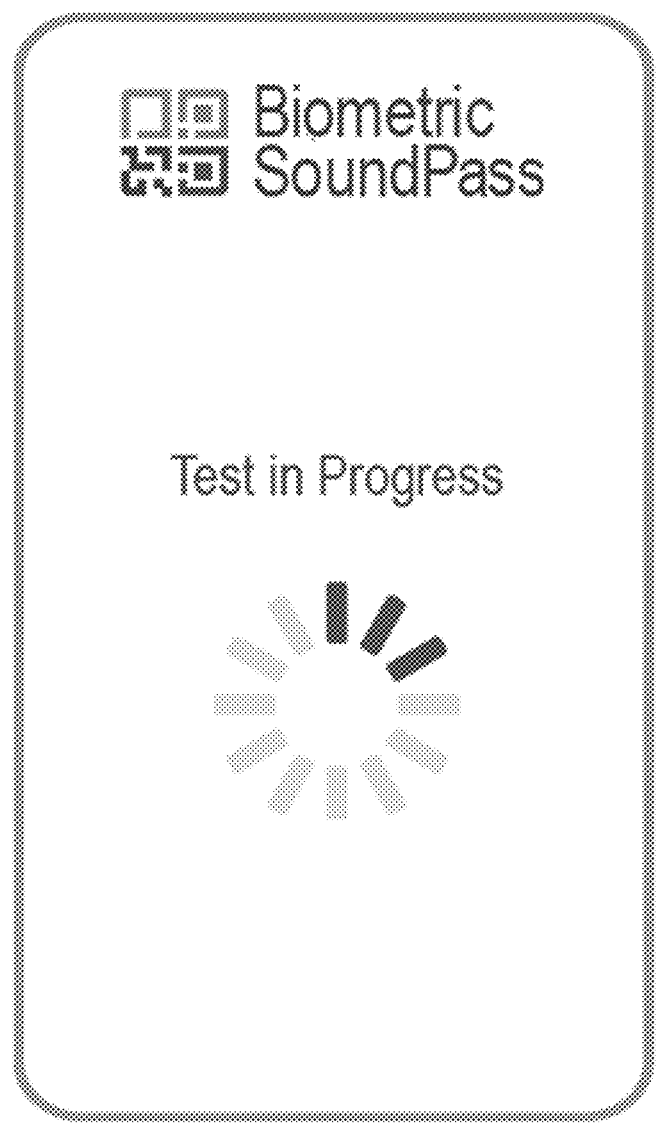
FIG. 17 depicts an illustrative testing progress interface according to aspects of embodiments of the present disclosure.

FIG. 17 depicts an illustrative testing progress interface according to aspects of embodiments of the present disclosure. In some embodiments, there may be a latency (e.g., about two minutes or more) between submitting sound signal data signature recordings and the sound signal data signature analysis service completing analysis. During this latency, a test progress interface may be presented.

Figure 18:
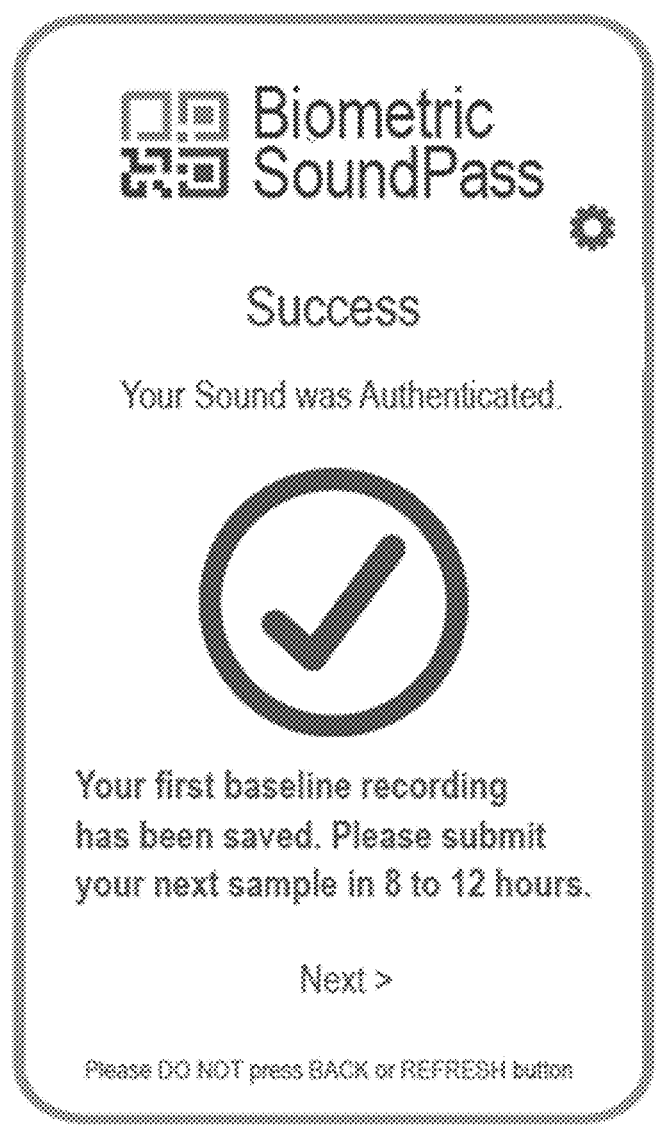
FIG. 18 depicts an illustrative submission acceptance interface according to aspects of embodiments of the present disclosure.

FIG. 18 depicts an illustrative submission acceptance interface according to aspects of embodiments of the present disclosure. In some embodiments, once the sound signal data signature analysis service successfully completes analysis of the sound signal data signature records, the user may be presented with a submission acceptance interface indicating the success. In some embodiments, the submission acceptance interface may include a reminder for next steps.

Figure 19:
FIG. 19 depicts an illustrative submission denial interface according to aspects of embodiments of the present disclosure.

FIG. 19 depicts an illustrative submission denial interface according to aspects of embodiments of the present disclosure. Upon the sound signal data signature analysis service failing to process sound signal data signature recordings in the submitted recordings, the user may be presented with an interface indicating the failure. Failure may occur where background noise obscures the sound signal data signature, or for other reasons. In some embodiments, the interface may include directions for resubmitting.

Figure 20:
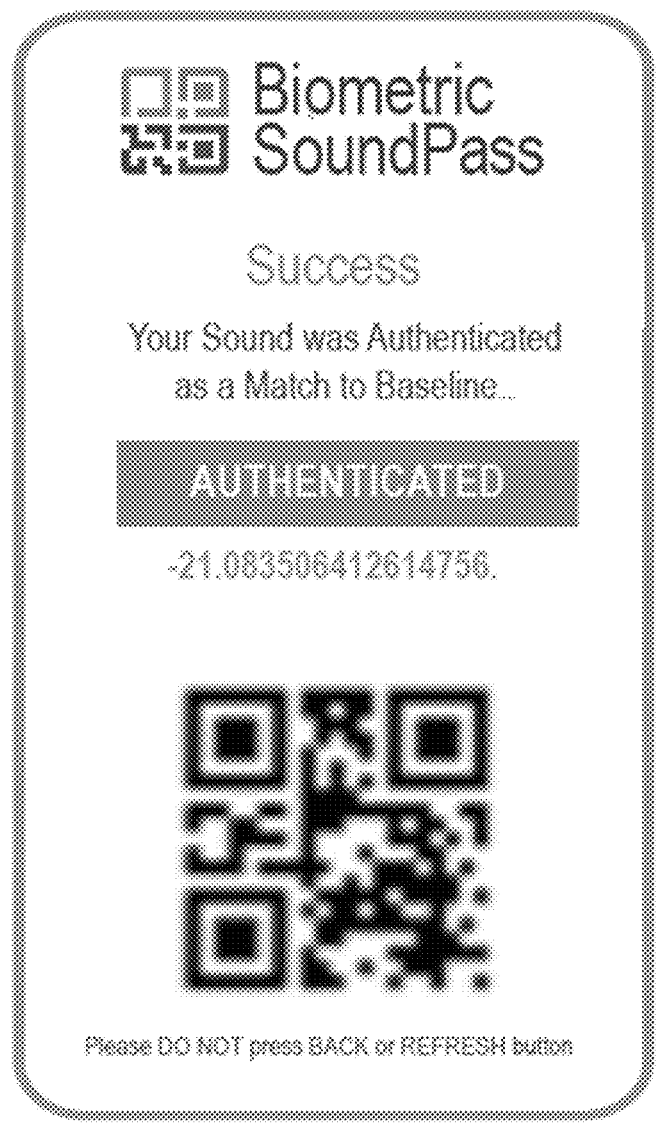
FIG. 20 depicts an illustrative successful authentication interface according to aspects of embodiments of the present disclosure.

FIG. 20 depicts an illustrative successful authentication interface according to aspects of embodiments of the present disclosure. In some embodiments upon submitting a sound signal data signature after establishing a baseline, the user may be presented with an interface indicating that the sound signal data signature matches the baseline, thus forming a successful authentication. In some embodiments, the successful authentication may include a scannable barcode, QR code or other encoding for use in access control, such that a premises operator may validate the user including based on the authenticated sound signal data signature.

Figure 21:
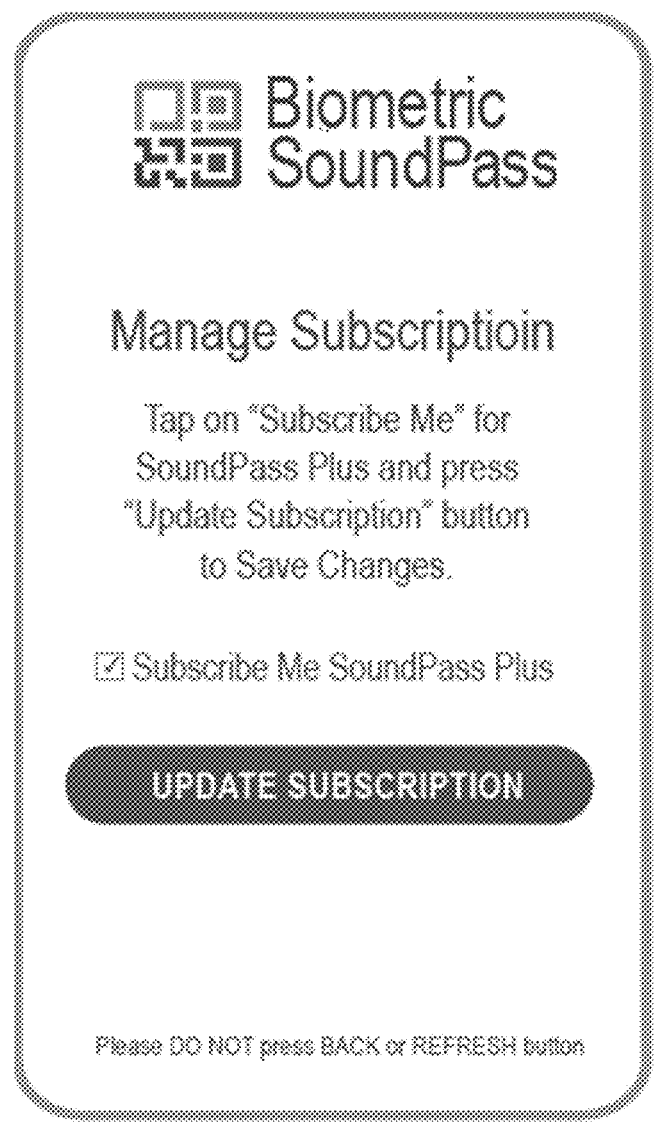
FIG. 21 depicts an illustrative subscription management interface according to aspects of embodiments of the present disclosure.

FIG. 21 depicts an illustrative subscription management interface according to aspects of embodiments of the present disclosure. In some embodiments, the subscription management may include functionality to update profile information and/or subscription levels. For example, the user may upload new photo IDs, set permissions, change subscription levels or payment information, etc.

Figure 22:
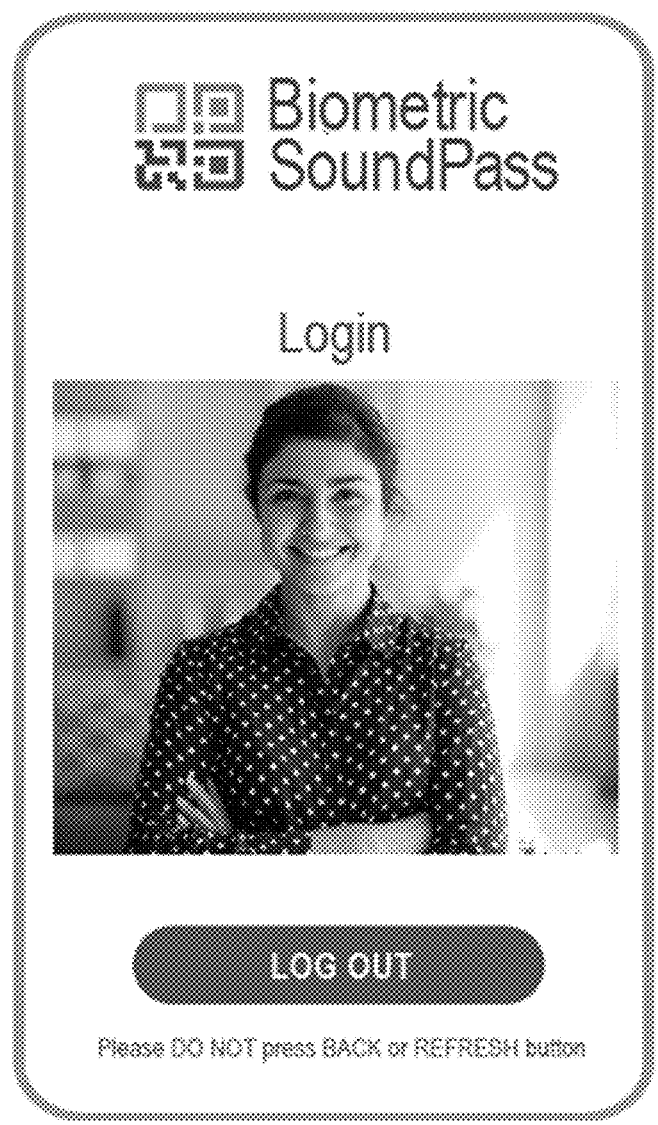
FIG. 22 depicts an illustrative logout interface according to aspects of embodiments of the present disclosure.

FIG. 22 depicts an illustrative logout interface according to aspects of embodiments of the present disclosure.

Figure 23:
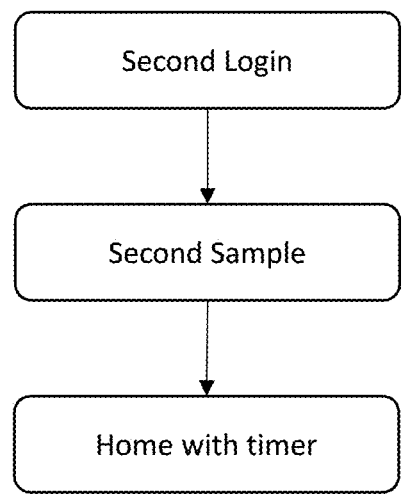
FIG. 23 depicts a flow for user registration of a baseline sound signal data signature using a second sample according to aspects of embodiments of the present disclosure.

FIG. 23 depicts a flow for user registration of a baseline sound signal data signature signature using a second sample according to aspects of embodiments of the present disclosure. Referring to FIG. 23, a user may initiate a second login with the user computing device to log into the application for the sound signal data signature analysis system. In some embodiments, the user may enter account credentials, such as a username or email and password.

In some embodiments, the application may transition from the login page to a second sample collection. In some embodiments, the second sample collection may include an interface with a user selectable element to select to record. Upon selection of the record element, the user may force a sound signal data signature to record a second sample sound signal data signature. In some embodiments, if there is an error collecting the sample, there would be a simple "error, please try again" note on the same record page.

In some embodiments, upon completion of the recording of the second sample, the application may transition to the home page having the timer. The timer may include a countdown, the end of which may trigger a next recording for another sample.

Figure 24:
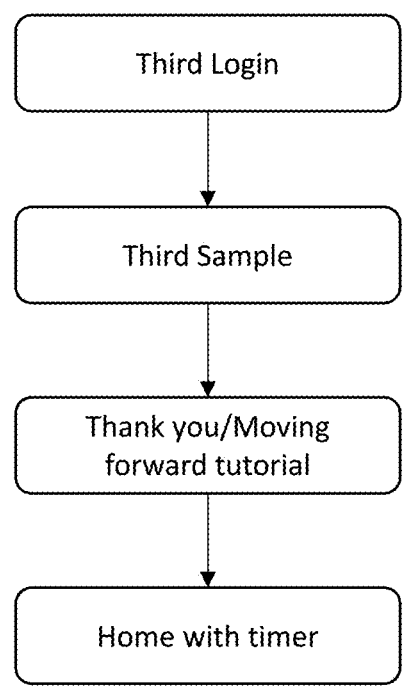
FIG. 24 depicts a flow for user registration of a baseline sound signal data signature using a third sample according to aspects of embodiments of the present disclosure.

FIG. 24 depicts a flow for user registration of a baseline sound signal data signature using a third sample according to aspects of embodiments of the present disclosure. Referring to FIG. 24, a user may initiate a third login with the user computing device to log into the application for the sound signal data signature analysis system. In some embodiments, the user may enter account credentials, such as a username or email and password. In some embodiments, the third login may be that last one needed to complete a baseline. However, in some embodiments, the process may be repeated more or fewer times, such as, e.g., two times, five times, six times, seven times, eight times, nine times, ten times, or other suitable number of times.

In some embodiments, the application may transition from the login page to a third sample collection. In some embodiments, the third sample collection may include an interface with a user selectable element to select to record. Upon selection of the record element, the user may force a sound signal data signature to record a third sample sound signal data signature. In some embodiments, if there is an error collecting the sample, there would be a simple "error, please try again" note on the same record page.

In some embodiments, upon completion of the recording of the third sample, the application may transition to a Thank you/Moving forward tutorial. In some embodiments, the tutorial may include an explanation of how to perform sound signal data signature checks in regular use.

In some embodiments, upon completion of the Thank you/Moving forward tutorial, the application may transition to the home page having the timer. The timer may include a countdown, the end of which may trigger a next recording for a new sound signal data signature for testing.

Figure 25:
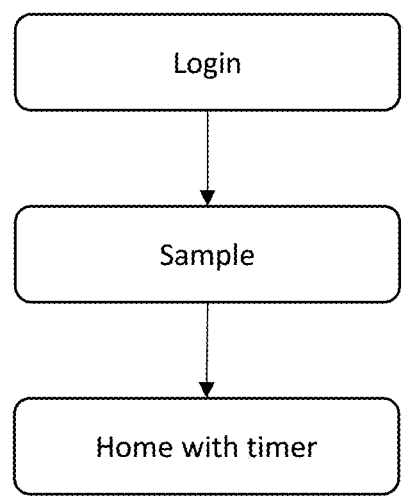
FIG. 25 depicts a flow for user authentication of a new sound vocalization sample according to a registered baseline sound signal data signature according to aspects of embodiments of the present disclosure.

FIG. 25 depicts a flow for user authentication of a new sound vocalization sample according to a registered baseline sound signal data signature according to aspects of embodiments of the present disclosure. Referring to FIG. 25, a user may initiate a login with the user computing device to log into the application for the sound signal data signature analysis system. In some embodiments, the user may enter account credentials, such as a username or email and password.

In some embodiments, the application may transition from the login page to a sample collection. In some embodiments, the sample collection may include an interface with a user selectable element to select to record. Upon selection of the record element, the user may force a sound signal data signature to record a new sound signal data signature. In some embodiments, if there is an error collecting the sample, there would be a simple "error, please try again" note on the same record page.

In some embodiments, upon completion of the recording of the sample, the application may transition to the home page having the timer. The timer may include a countdown, the end of which may trigger a next recording for another sample.

FIGS. 26A through 28 depict an example flow for access control for an entrant using the sound signal data signature analysis system in accordance with embodiments of the present description.

Figure 26A:
FIGS. 26A-26C depict example login screens for a premises operator controlling access to entrants according to an example flow for access control for an entrant using the sound signal data signature analysis system in accordance with embodiments of the present description.
Figure 26B:
Figure 26C:
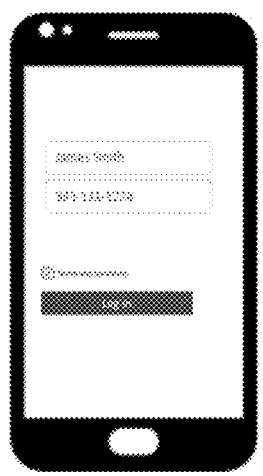

FIG. 26A through 26C depict example login screens for a premises operator controlling access to entrants, e.g., at performance venues, sporting event venues, office buildings, residential buildings, healthcare facilities, etc. In some embodiments, FIG. 26A shows the login screen on a laptop computer. In some embodiments, FIG. 26B shows the login screen on a tablet. In some embodiments, FIG. 26A shows the login screen on a smartphone.

In some embodiments, logging in to the sound signal data signature analysis system, such as into the access control server, via the login screen may provide the premises operator with administrative tools. For example, there may be an option to select to scan an entrant, a report viewer to view scan reports of entrants, e.g., by the day, by the week, by the month, etc., an error report viewer to view error reports, or options to configure account features and settings such as, e.g., updates, enhancements, fees, geofencing, rescan notifications, etc. or other suitable tools or any combination thereof.

In some embodiments, the rescan notifications may include, e.g., settings to notify the premises operator of entrants that have not scanned in for, e.g., greater than a threshold duration, such as, e.g., 2 hours, 3 hours, 4 hours, 5 hours, 6 hours, etc. In some embodiments, the rescanning notifications may also include the notification of entrants to rescan after the threshold duration. In some embodiments, to prevent unnecessary rescanning notifications, the premises operator may scan entrants after entry and upon exit to identify entrants that are no longer present, and thus do not need to rescan. Alternatively, or in addition, the entrants may have their locations uploaded to the access control server such that when an entrant's location is not in a proximity of the premises, the entrant is deemed to be away and thus rescanning is unnecessary.

Figure 27A:
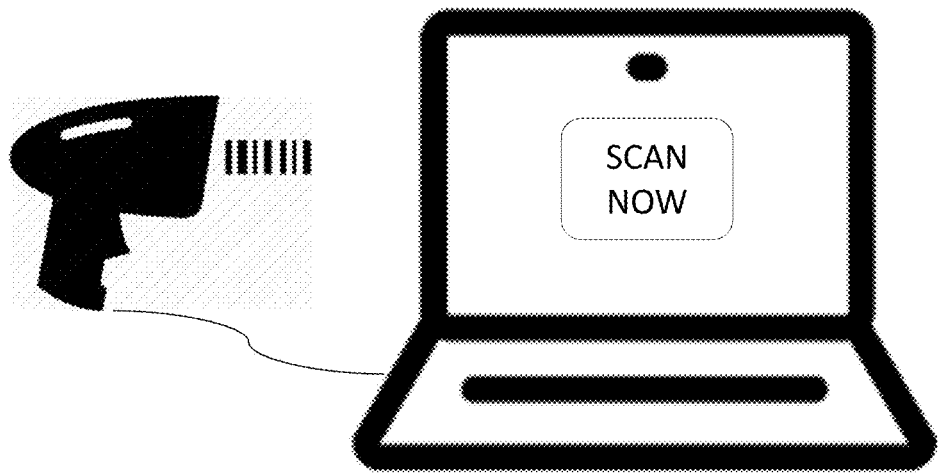
FIGS. 27A-27C depict variations for scanning an entrant's code for authentication based on sound signal data signature analysis according to embodiments of the present disclosure.
Figure 27B:
Figure 27C:
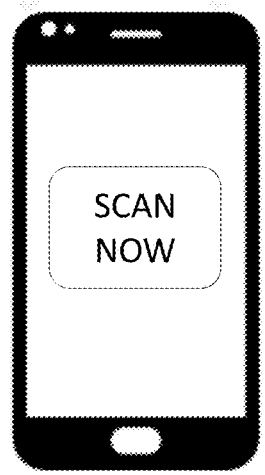

FIGS. 27A through 27C depict variations for scanning an entrant's code for authentication based on sound signal data signature analysis according to embodiments of the present disclosure.

In some embodiments, the premises operator may use a barcode scanner connected to a laptop computer, e.g., the laptop of FIG. 27A, or using a built-in camera such as in the camera of a tablet of FIG. 27B or a smartphone of FIG. 27C. In some embodiments, the device being used to scan the code may automatically capture the code and extract data encoded therein upon the code being within the field of view of the device, or the device may include a user selectable element to select to scan the code manually.

Figure 28:
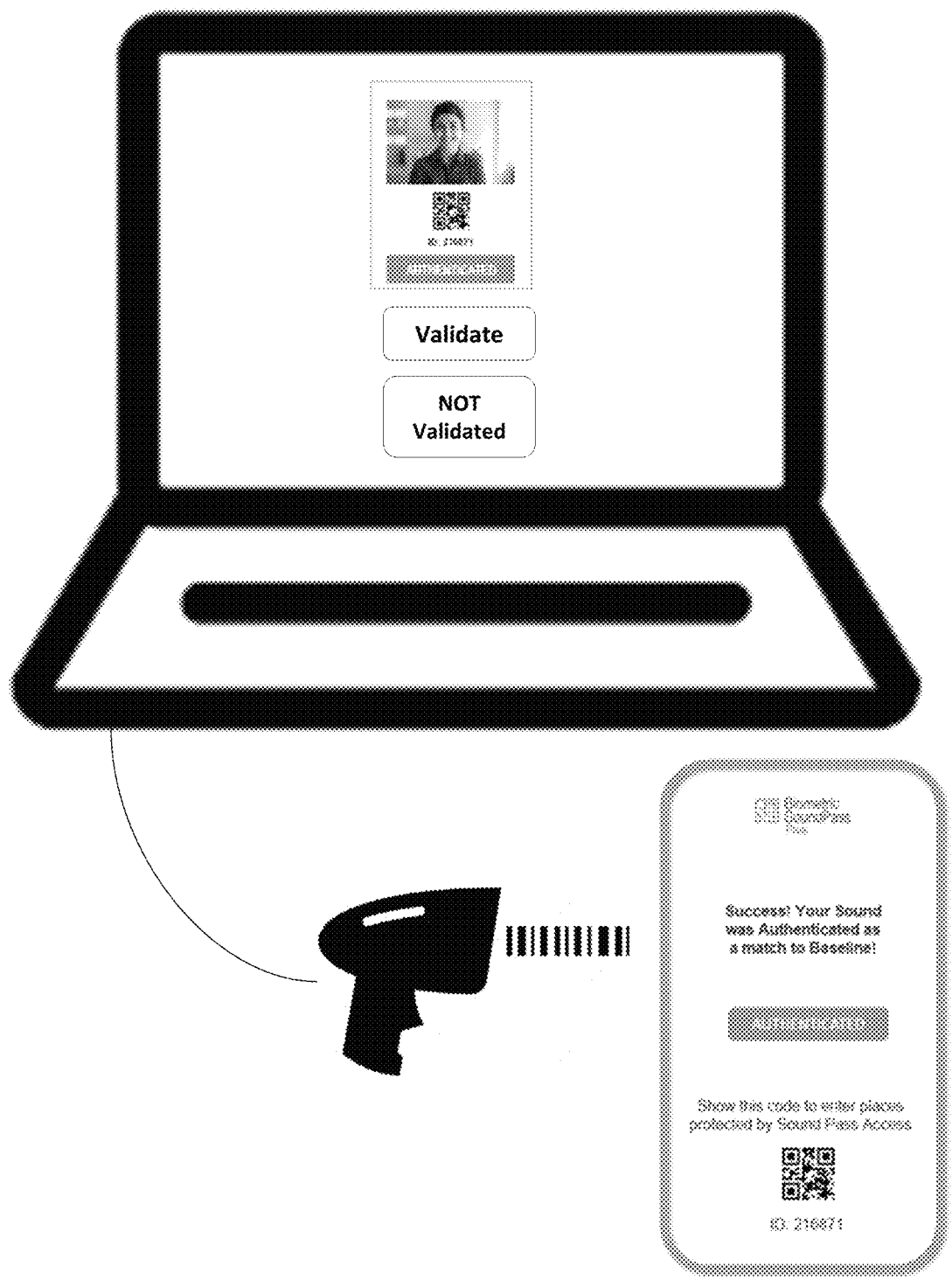
FIG. 28 depicts validation of an entrant based on an authenticated sound signal data signature analysis in accordance with embodiments of the present disclosure.

FIG. 28 depicts validation of an entrant based on an authenticated sound signal data signature analysis in accordance with embodiments of the present disclosure.

In some embodiments, if the sound is authenticated, the scanning enables an option to validate or not validate based on, e.g., a visual match between a registered image of the individual and the entrant requesting access. In some embodiments, whether or not the entrant is validated, the application may then return to a scanning screen, e.g., of FIG. 27A through 27C.

In some embodiments, the application may track validation data and entrant data. For example, the application may track a user identifier of each entrant validated and/or not validated, a timestamp of the validation attempt, a device used by the entrant, an identifier of the premises operator, a location (e.g., according to global positioning system (GPS) data or other location data), among other data attributes or any combination thereof. In some embodiments, such data may be used to view a history of validation attempts filterable by each data attribute.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may.

Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/

PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RCS, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added, and/or any desired steps may be eliminated).

What is claimed is:

1. A method comprising:
receiving, by at least one processor, a plurality of audio recordings from a user device associated with a user;
wherein the plurality of audio recordings represent audio from a plurality of forced cough vocalizations produced by the user;
utilizing, by the at least one processor, at least one audio filter to extract a plurality of forced cough vocalization recordings from the plurality of audio recordings;
generating, by the at least one processor, a plurality of signal data signatures representative of the plurality of forced cough vocalization recordings;
generating, by the at least one processor, a plurality of combinations of signal data signatures, wherein each combination of signal data signatures of the plurality of combinations of signal data signatures comprises a unique combination of:
a first group of non-repeated signal data signatures of the plurality of signal data signatures and a second group of non-repeated signal data signatures of the plurality of signal data signatures;
generating, by the at least one processor, a plurality of Gaussian mixture models, wherein each Gaussian mixture model of the plurality of Gaussian mixture models is formed from the first group of non-repeated signal data signatures of each combination of each combination of signal data signatures of the plurality of combinations of signal data signatures;
utilizing, by the at least one processor, each Gaussian mixture model of the plurality of Gaussian mixture models to produce at least one match value for the second group of non-repeated signal data signatures of each Gaussian mixture model based at least in part on the first group of non-repeated signal data signatures of each Gaussian mixture model;
wherein the at least one match value of each second group of non-repeated signal data signatures comprises at least one probability of each second group of non-repeated signal data signatures matching to each first group of non-repeated signal data signatures;
determining, by the at least one processor, at least one statistical score associated with the at least one match value of each Gaussian mixture model;
determining, by the at least one processor, at least one baseline model from the plurality of Gaussian mixture models based at least in part on the at least one statistical score associated with the at least one match value of each Gaussian mixture model; and
storing, by the at least one processor, the at least one baseline model is in associated with a user profile associated with the user to enable authentication of at least one subsequent audio recording.

2. The method of claim 1, further comprising:
receiving, by the at least one processor, the at least one subsequent audio recording from the user device;
utilizing, by the at least one processor, the at least one audio filter to extract at least one subsequent forced cough vocalization recording from the at least one subsequent audio recording;
generating, by the at least one processor, at least one subsequent signal data signatures representative of the at least one subsequent forced cough vocalization recording;
utilizing, by the at least one processor, the at least one baseline model to produce at least one subsequent match value for the at least one subsequent signal data signatures based at least in part on the first group of non-repeated signal data signatures of the at least one baseline model;
generating, by the at least one processor, at least one authentication based at least in part on the at least one subsequent match value; and
instructing, by the at least one processor, the user device to render a notification representative of the at least one authentication.

3. The method of claim 1, wherein the notification comprises a quick response (QR) code that encodes the at least one authentication.

4. The method of claim 3, wherein the QR code is configured to enable access to at least one access controlled area based on the at least one authentication.

5. The method of claim 1, wherein the at least one statistical score comprises a distance from an average of the at least one match value across the plurality of Gaussian mixture models.

6. The method of claim 1, further comprising:
determining, by the at least one processor, an average of the at least one match value across the plurality of Gaussian mixture models;
determining, by the at least one processor, a standard deviation of the at least one match value across the plurality of Gaussian mixture models;
determining, by the at least one processor, at least one lower outlier confidence interval bound and at least one upper outlier confidence interval bound based at least in part on the average and the standard deviation; and
removing, by the at least one processor, at least one outlier Gaussian mixture model based at least in part on the at least one match value of the at least one outlier Gaussian mixture model being at least one of:
greater than the at least one upper outlier confidence interval bound, or less than the at least one upper outlier confidence interval bound.

7. The method of claim 6, further comprising instructing, by the at least one processor, the user device to render a prompt that requests the user to provide at least one new audio recording in response to the at least one outlier Gaussian mixture model.

8. A system comprising:
at least one processor configured to execute software instructions that, upon execution, cause the at least one processor to perform steps to:
receive a plurality of audio recordings from a user device associated with a user;
wherein the plurality of audio recordings represent audio from a plurality of forced cough vocalizations produced by the user;
utilize at least one audio filter to extract a plurality of forced cough vocalization recordings from the plurality of audio recordings;
generate a plurality of signal data signatures representative of the plurality of forced cough vocalization recordings;
generate a plurality of combinations of signal data signatures, wherein each combination of signal data signatures of the plurality of combinations of signal data signatures comprises a unique combination of:
a first group of non-repeated signal data signatures of the plurality of signal data signatures and a second group of non-repeated signal data signatures of the plurality of signal data signatures;
generate a plurality of Gaussian mixture models, wherein each Gaussian mixture model of the plurality of Gaussian mixture models is formed from the first group of non-repeated signal data signatures of each combination of each combination of signal data signatures of the plurality of combinations of signal data signatures;
utilize each Gaussian mixture model of the plurality of Gaussian mixture models to produce at least one match value for the second group of non-repeated signal data signatures of each Gaussian mixture model based at least in part on the first group of non-repeated signal data signatures of each Gaussian mixture model;
wherein the at least one match value of each second group of non-repeated signal data signatures comprises at least one probability of each second group of non-repeated signal data signatures matching to each first group of non-repeated signal data signatures;
determine at least one statistical score associated with the at least one match value of each Gaussian mixture model;
determine at least one baseline model from the plurality of Gaussian mixture models based at least in part on the at least one statistical score associated with the at least one match value of each Gaussian mixture model; and
store the at least one baseline model is associated with a user profile associated with the user to enable authentication of at least one subsequent audio recording.

9. The system of claim 8, wherein the at least one processor is further configured to execute software instructions that, upon execution, cause the at least one processor to perform further steps to:
receive the at least one subsequent audio recording from the user device;
utilize the at least one audio filter to extract at least one subsequent forced cough vocalization recording from the at least one subsequent audio recording;
generate at least one subsequent signal data signatures representative of the at least one subsequent forced cough vocalization recording;
utilize the at least one baseline model to produce at least one subsequent match value for the at least one subsequent signal data signatures based at least in part on the first group of non-repeated signal data signatures of the at least one baseline model;
generate at least one authentication based at least in part on the at least one subsequent match value; and
instruct the user device to render a notification representative of the at least one authentication.

10. The system of claim 8, wherein the notification comprises a quick response (QR) code that encodes the at least one authentication.

11. The system of claim 10, wherein the QR code is configured to enable access to at least one access controlled area based on the at least one authentication.

12. The system of claim 8, wherein the at least one statistical score comprises a distance from an average of the at least one match value across the plurality of Gaussian mixture models.

13. The system of claim 8, wherein the at least one processor is further configured to execute software instructions that, upon execution, cause the at least one processor to perform further steps to:
determine an average of the at least one match value across the plurality of Gaussian mixture models;
determine a standard deviation of the at least one match value across the plurality of Gaussian mixture models;
determine at least one lower outlier confidence interval bound and at least one upper outlier confidence interval bound based at least in part on the average and the standard deviation; and
remove at least one outlier Gaussian mixture model based at least in part on the at least one match value of the at least one outlier Gaussian mixture model being at least one of:
greater than the at least one upper outlier confidence interval bound, or
less than the at least one upper outlier confidence interval bound.

14. The system of claim 13, wherein the at least one processor is further configured to execute software instructions that, upon execution, cause the at least one processor to perform further steps to instruct the user device to render a prompt that requests the user to provide at least one new audio recording in response to the at least one outlier Gaussian mixture model.

15. A non-transitory computer readable medium having software instructions stored thereon, the software instructions configured to cause at least one processor to perform steps comprising:
receiving a plurality of audio recordings from a user device associated with a user;
wherein the plurality of audio recordings represent audio from a plurality of forced cough vocalizations produced by the user;
utilizing at least one audio filter to extract a plurality of forced cough vocalization recordings from the plurality of audio recordings;
generating a plurality of signal data signatures representative of the plurality of forced cough vocalization recordings;
generating a plurality of combinations of signal data signatures, wherein each combination of signal data signatures of the plurality of combinations of signal data signatures comprises a unique combination of:

a first group of non-repeated signal data signatures of the plurality of signal data signatures and a second group of non-repeated signal data signatures of the plurality of signal data signatures;

generating a plurality of Gaussian mixture models, wherein each Gaussian mixture model of the plurality of Gaussian mixture models is formed from the first group of non-repeated signal data signatures of each combination of each combination of signal data signatures of the plurality of combinations of signal data signatures;

utilizing each Gaussian mixture model of the plurality of Gaussian mixture models to produce at least one match value for the second group of non-repeated signal data signatures of each Gaussian mixture model based at least in part on the first group of non-repeated signal data signatures of each Gaussian mixture model;

wherein the at least one match value of each second group of non-repeated signal data signatures comprises at least one probability of each second group of non-repeated signal data signatures matching to each first group of non-repeated signal data signatures;

determining at least one statistical score associated with the at least one match value of each Gaussian mixture model;

determining at least one baseline model from the plurality of Gaussian mixture models based at least in part on the at least one statistical score associated with the at least one match value of each Gaussian mixture model; and storing the at least one baseline model is in associated with a user profile associated with the user to enable authentication of at least one subsequent audio recording.

16. The non-transitory computer readable medium of claim 15, wherein the software instructions are further configured to cause the at least one processor to perform steps comprising:

receiving the at least one subsequent audio recording from the user device;

utilizing the at least one audio filter to extract at least one subsequent forced cough vocalization recording from the at least one subsequent audio recording;

generating at least one subsequent signal data signatures representative of the at least one subsequent forced cough vocalization recording;

utilizing the at least one baseline model to produce at least one subsequent match value for the at least one subsequent signal data signatures based at least in part on the first group of non-repeated signal data signatures of the at least one baseline model;

generating at least one authentication based at least in part on the at least one subsequent match value; and instructing the user device to render a notification representative of the at least one authentication.

17. The non-transitory computer readable medium of claim 15, wherein the notification comprises a quick response (QR) code that encodes the at least one authentication.

18. The non-transitory computer readable medium of claim 17, wherein the QR code is configured to enable access to at least one access controlled area based on the at least one authentication.

19. The non-transitory computer readable medium of claim 15, wherein the software instructions are further configured to cause the at least one processor to perform steps comprising:

determining an average of the at least one match value across the plurality of Gaussian mixture models;

determining a standard deviation of the at least one match value across the plurality of Gaussian mixture models;

determining at least one lower outlier confidence interval bound and at least one upper outlier confidence interval bound based at least in part on the average and the standard deviation; and removing at least one outlier Gaussian mixture model based at least in part on the at least one match value of the at least one outlier Gaussian mixture model being at least one of:

greater than the at least one upper outlier confidence interval bound, or less than the at least one upper outlier confidence interval bound.

20. The non-transitory computer readable medium of claim 19, wherein the software instructions are further configured to cause the at least one processor to perform steps comprising instructing the user device to render a prompt that requests the user to provide at least one new audio recording in response to the at least one outlier Gaussian mixture model.

* * * * *